US012416645B2

(12) United States Patent
Sattler

(10) Patent No.: US 12,416,645 B2
(45) Date of Patent: Sep. 16, 2025

(54) AUTOMATIC ANALYZER

(71) Applicant: Roche Diagnostics Operations, Inc., Indianapolis, IN (US)

(72) Inventor: Stephan Sattler, Starnberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 572 days.

(21) Appl. No.: 17/931,620

(22) Filed: Sep. 13, 2022

(65) Prior Publication Data

US 2023/0003755 A1    Jan. 5, 2023

Related U.S. Application Data

(63) Continuation of application No. PCT/EP2021/057054, filed on Mar. 19, 2021.

(30) Foreign Application Priority Data

Mar. 19, 2020  (EP) .................................... 20164264

(51) Int. Cl.
*G01N 35/10*  (2006.01)
*G01N 35/00*  (2006.01)

(52) U.S. Cl.
CPC ... *G01N 35/1002* (2013.01); *G01N 35/00732* (2013.01); *G01N 35/0099* (2013.01); *G01N 2035/00752* (2013.01)

(58) Field of Classification Search
CPC ......... G01N 35/1002; G01N 35/00732; G01N 35/0099; G01N 2035/00752; G01N 2035/00287; G01N 35/1011; B01L 3/0227
See application file for complete search history.

(56) References Cited

U.S. PATENT DOCUMENTS 5,270,211 A * 12/1993 Kelln ................... G01N 35/025
422/547
5,983,734 A * 11/1999 Mathur ............ G01N 35/00712
73/864.24

(Continued)

FOREIGN PATENT DOCUMENTS

EP        2290372 A2    3/2011
JP     H11160326 A      6/1999

(Continued)

OTHER PUBLICATIONS

International Search Report issued Jun. 29, 2021, in Application No. PCT/EP2021/057054, 3 pp.

(Continued)

*Primary Examiner* — Benjamin R Whatley
(74) *Attorney, Agent, or Firm* — Taft Stettinius & Hollister LLP

(57) ABSTRACT

An automatic analyzer for analyzing samples comprising an immersion tube configured to retrieve a reagent stored in a reagent vessel and a lifting device configured to lift and lower the immersion tube. The lifting device comprises a guide rail on which the immersion tube is moveable between a lowered position, in which the immersion tube is immersed into the reagent vessel, and a lifted position, in which the immersion tube is retracted from the reagent vessel, and at least one biasing member configured to bias the immersion tube towards the lowered position with a predetermined biasing force. The analyzer further comprises a detector configured to detect an identity of the reagent, and a locking device configured to lock the immersion tube in the lifted position and so the immersion tube is moved towards the lowered position only if the reagent identity detected by the detector corresponds to a target identity.

13 Claims, 14 Drawing Sheets

(56) References Cited

U.S. PATENT DOCUMENTS

| | | | |
|---|---|---|---|
| 2007/0251341 A1* | 11/2007 | Balmer | G01N 35/1011 |
| | | | 74/49 |
| 2008/0003140 A1 | 1/2008 | Di et al. | |
| 2010/0104478 A1 | 4/2010 | Kondou | |
| 2011/0223064 A1 | 9/2011 | Katsumi et al. | |
| 2011/0277565 A1* | 11/2011 | Winkler | G01N 35/1009 |
| | | | 73/864.11 |
| 2020/0254440 A1* | 8/2020 | Hintikka | B01L 3/0279 |
| 2021/0025909 A1* | 1/2021 | Miyakawa | G01N 35/1011 |

FOREIGN PATENT DOCUMENTS

| | | | |
|---|---|---|---|
| JP | 2001183380 A | 7/2001 | |
| WO | 2019198493 A1 | 10/2019 | |

OTHER PUBLICATIONS

Office Action; Japanese Patent Office; Japanese Application No. 2022-550969; Aug. 14, 2023; 3 pages.

Written Opinion of the International Searching Authority, European Patent Office, International Patent Application No. PCT/EP2021/057054, Sep. 23, 2021, 5 pages.

International Preliminary Report on Patentability, The International Bureau of WIPO, International Patent Application No. PCT/EP2021/057054, Sep. 29, 2022, 6 pages.

\* cited by examiner

AUTOMATIC ANALYZER

CROSS-REFERENCE TO RELATED APPLICATIONS

This application is a continuation of International Patent Application No. PCT/EP2021/057054, filed 19 Mar. 2021, which claims priority to European Patent Application No. 20164264.2, filed 19 Mar. 2020, the disclosures of which are hereby incorporated by reference in their entirety.

TECHNICAL FIELD

The present disclosure relates to an automatic analyzer using disposable parts used in contact with samples.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps or workflow steps on one or more biological samples and/or one or more reagents, such as pre-analytical instruments, post-analytical instruments and also analytical instruments.

Analytical instruments or analyzers are configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units assisting with the pipetting, dosing, and mixing of samples and/or reagents.

The analyzer may comprise a reagent holding unit for holding reagents to perform the assays. Reagents may be arranged for example in the form of vessels, containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzers are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

Such automatic analyzers allow to increase the number of analytical processes and obtainable measurements values. For this reason, such automatic analyzers use several reagents provided in reagent vessels at the same time. For example, 6 to 8 different reagents are used with such an automatic analyzer. Typically, the reagent is drawn from the reagent vessel by means of an immersion tube immersed into the reagent vessel. In order to ensure that the correct reagent is supplied to the automatic analyzer for its target analytical process, it is necessary to identify the reagent and to ensure that the respective reagent vessel is at its target position. This kind of identification usually takes place only when a reagent vessel is replaced. The replacement process is rather cumbersome as the reagent vessels are usually closed by means of a cap threaded thereto.

SUMMARY

Although the embodiments of the present disclosure are not limited to specific advantages or functionality, it is noted that in accordance with the present disclosure an automatic analyzer is provided that aims to facilitate the replacement process for the reagent vessel and to reduce the risk of a faulty operation when replacing a reagent vessel.

In accordance with one embodiment of the disclosure, an automatic analyzer for analyzing samples is provided, comprising: an immersion tube configured to retrieve a reagent stored in a reagent vessel, a lifting device configured to lift and to lower the immersion tube, wherein the lifting device comprises: a guide rail on which the immersion tube is slidably moveable between a lowered position, in which the immersion tube is configured to be immersed into the reagent vessel, and a lifted position, in which the immersion tube is configured to be retracted from the reagent vessel, and at least one biasing member configured to bias the immersion tube towards the lowered position with a predetermined biasing force, a detector configured to detect an identity of the reagent, and a locking device configured to lock the immersion tube in the lifted position and to allow the immersion tube to be moved towards the lowered position only if the identity of the reagent detected by the detector corresponds to a target identity of the reagent.

These and other features of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
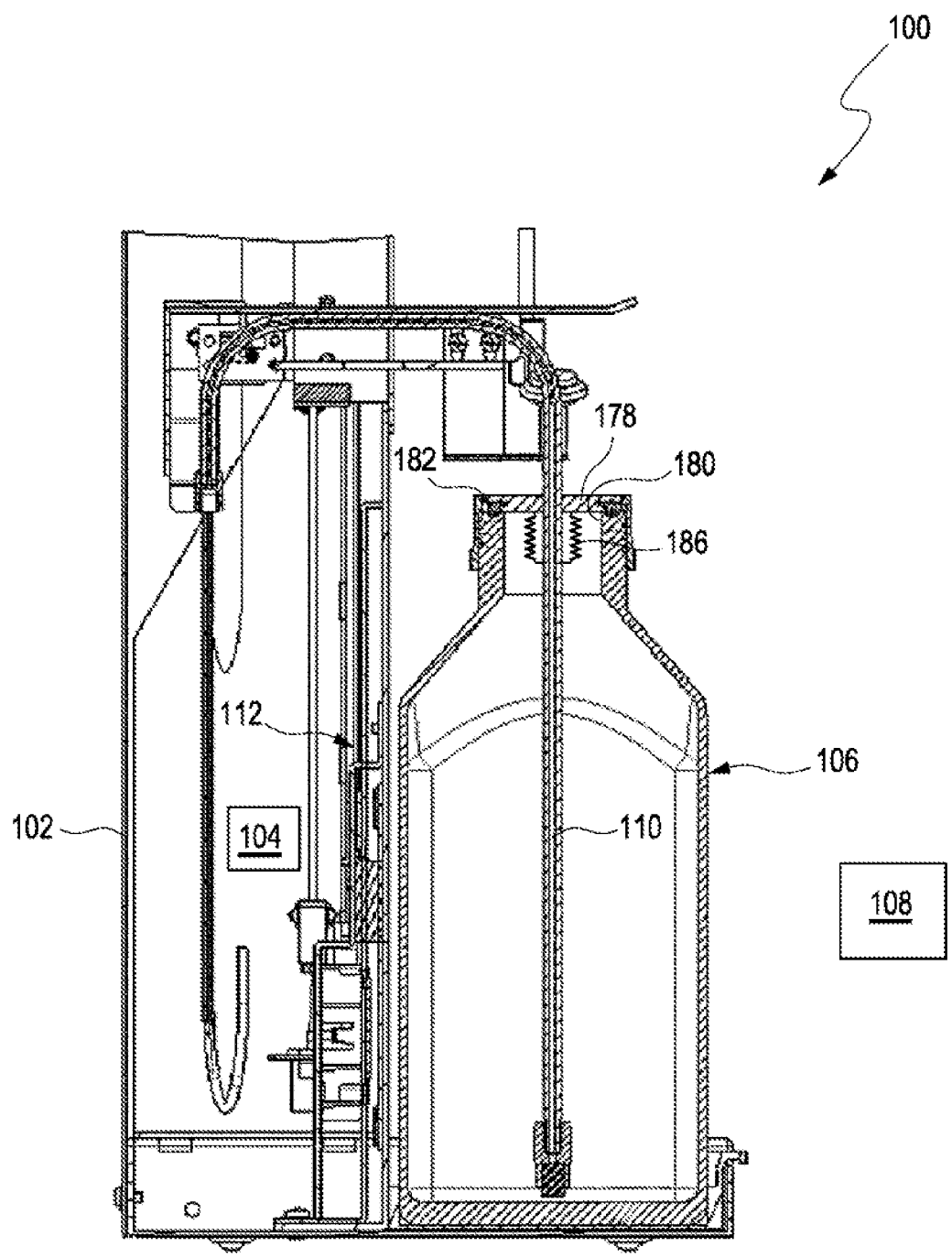
FIG. 1 shows a cross-sectional view of an automatic analyzer.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

According to the disclosed automatic analyzer, the automatic analyzer comprises an immersion tube configured to retrieve a reagent stored in a reagent vessel. The automatic analyzer further comprises a lifting device configured to lift and to lower the immersion tube. The lifting device comprises a guide rail on which the immersion tube is slidably moveable between a lowered position, in which the immersion tube is configured to be immersed into the reagent vessel, and a lifted position, in which the immersion tube is configured to be retracted from the reagent vessel, and at least one biasing member configured to bias the immersion tube towards the lowered position with a predetermined biasing force. The automatic analyzer further comprises a detector configured to detect an identity of the reagent. The automatic analyzer further comprises a locking device configured to lock the immersion tube in the lifted position and to allow the immersion tube to be moved towards the lowered position only if the identity of the reagent detected by the detector corresponds to a target identity of the reagent.

With other words, the immersion tube may be raised from a lowered position, in which it is immersed into the reagent vessel, to an upper position, in which the immersion tube is retracted from the reagent vessel, by means of a lifting device. As the immersion tube is usually manually raised by a user from the lowered position, there is a risk of a faulty operation. Particularly, the user may replace the reagent vessel while the new immersion tube is not fully in the upper position but the user holds the immersion tube at an intermediate position just allowing to change the reagent vessel as the immersion tube is retracted from the reagent vessel. If the user subsequently lowers the immersion tube, the identification process has not been triggered and a wrong reagent may be drawn by the immersion tube with the risk of a damage to the analytical instrument and/or with the result of a wrong measurement result which may be even dangerous to life. With the present disclosure, the identification of the reagent is initiated when the immersion tube is correctly in its upper position. The identification of the reagent is triggered by a locking mechanism configured to at least temporarily lock the immersion tube in its upper position where it is locked by the locking mechanism. Further, as the immersion tube is biased towards the lowered position with a predetermined biasing force, the immersion tube is reliably pressed into the reagent vessel. Thus, any evaporation of the reagent being hazardous may be reliably prevented as a sufficient sealing force may be provided which acts onto a rim defining an opening of the reagent vessel such as an opening at a reagent bottle neck.

The term "automatic analyzer" as used herein is a broad term and is to be given its ordinary and customary meaning to a person of ordinary skill in the art and is not to be limited to a special or customized meaning. The term specifically may refer, without limitation, to any apparatus or apparatus component operable to execute one or more processing steps/workflow steps on one or more biological samples and/or reagents. The term "processing step" thereby refers to physically executed processing steps such as centrifugation, aliquotation, sample analysis and the like. The term "analyzer" covers pre-analytical sample work-cells, post-analytical sample work-cells and also analytical work-cells.

The term "reagent vessel" as used herein is a broad term and is to be given its ordinary and customary meaning to a person of ordinary skill in the art and is not to be limited to a special or customized meaning. The term specifically may refer, without limitation, to any container configured to store a reagent. Examples for such reagent vessels are bottles, cans, canisters and jerrycans.

The term "identify a reagent" or "identification of a reagent" as used herein is a broad term and is to be given its ordinary and customary meaning to a person of ordinary skill in the art and is not to be limited to a special or customized meaning. The term specifically may refer, without limitation, not only to the pure presence of a reagent but the identification of the type of reagent included in a reagent vessel. Such an identification may be realized by detecting an identification marker provided at the reagent vessel including the reagent.

The term "immersion tube" as used herein is a broad term and is to be given its ordinary and customary meaning to a person of ordinary skill in the art and is not to be limited to a special or customized meaning. The term specifically may refer, without limitation, to a tube shaped constructional member configured to be immersed into a liquid and to retrieve the liquid by means of aspirating or sucking. Particularly, the immersion tube may retrieve reagent from a reagent vessel by means of a negative pressure applied thereto allowing aspiration or sucking of the reagent.

The term "lifting device" as used herein is a broad term and is to be given its ordinary and customary meaning to a person of ordinary skill in the art and is not to be limited to a special or customized meaning. The term specifically may refer, without limitation, to any device configured to lift or raise an immersion tube. The lifting or raising may specifically be realized in a manual or driven manner.

The term "guide rail" as used herein is a broad term and is to be given its ordinary and customary meaning to a person of ordinary skill in the art and is not to be limited to a special or customized meaning. The term specifically may refer, without limitation, to a device configured to direct an object through a channel, conveyor or rail system. The guide rail may provide any kind of movement such as a curved, inclined, linear or straight movement. Particularly, the guide rail may provide an at least partially linear movement which is substantially, i.e., with a deviation of less than 10 degree and typically less than 5 degree, parallel to a direction of gravity. Particularly, the rail may be formed so as to engage with a guided member allowing a sliding movement thereof.

The term "locking device" as used herein is a broad term and is to be given its ordinary and customary meaning to a person of ordinary skill in the art and is not to be limited to a special or customized meaning. The term specifically may refer, without limitation, to a device configured to temporarily obstruct the immersion tube from moving.

The term "detector" as used herein is a broad term and is to be given its ordinary and customary meaning to a person of ordinary skill in the art and is not to be limited to a special or customized meaning. The term specifically may refer, without limitation, to a device, module, machine, or sub-system configured to detect events or changes in its environment and send the information to other electronics, frequently a computer processor. A detector is typically used with other electronics. Particularly, the detector is configured to detect or read information provided by the presence of an information carrier such as a marker.

The detector may be a RFID reader configured to detect the identity of the reagent by means of a RFID tag located at the reagent vessel. Alternatively or in addition, the detector may be a barcode reader configured to detect the identity of the reagent by means of a barcode located at the reagent vessel. Such readers allow a reliable detection of the tag or barcode and the information provided thereby. Thus, the reagent identity may be reliably detected.

The lifting device may further comprise an immersion tube holder holding the immersion tube and moveably mounted to the guide rail, a first support member connected to the at least one biasing member and moveably mounted to the guide rail, and a first engaging member configured to engage the immersion tube holder, wherein the first engaging member may be arranged adjacent a lower end of the guide rail, wherein the first engaging member may be configured to releasably lock the immersion tube holder and to integrally move the immersion tube into the lowered position when engaged therewith. The immersion tube holder safely supports or carries the immersion tube similar to a slide. Thus, the immersion tube is safely guided. The first engaging member allows to temporarily engage the immersion tube holder and to soften the movement of the immersion tube holder by means of locking the same. When the immersion tube holder is engaged and locked by the first engaging member, both concertedly move towards the lowered position with an even and smooth movement.

The first engaging member may be pivotable around a first axis being perpendicular with respect to a centerline of the guide rail. Thus, the immersion tube holder may be reliably locked by means of a pivotal movement of the first engaging member.

The first axis may be spaced apart from the centerline of the guide rail. Thus, a torque is caused around the first axis, which facilitates the pivotal movement and the locking of the first engaging member.

The immersion tube holder may comprise a first pin or roller, wherein the first engaging member may comprise a first slot configured to engage the first pin or roller. Thus, the first pin or roller may be reliably inserted into the first slot which provides a guiding of the first pin or roller. Thereby, the locking operation may be carried out in a reliable manner.

The first slot may be formed at least partially inclined with respect to the centerline of the guide rail such that the first engaging member is configured to be rotated around the first axis when engaging the first pin or roller. Thus, the insertion of the first pin or roller into the first slot is facilitated. Further, the inclination of the first slot increases the torque acting on the first axis.

The automatic analyzer may further comprise a first slotted guide member comprising a first guide slot and being arranged adjacent to the lower end of the guide rail and a first link assembly engaging the first guide slot and pivotally connected to the first engaging member, wherein the first guide slot may comprise a first slot portion being substantially parallel to the centerline of the guide rail and a second slot portion being substantially perpendicular to the centerline of the guide rail. Thus, the pivotal movement of the first engaging member is facilitated and automatically initiated as soon as the first engaging member engages the immersion tube holder.

The first link assembly may comprise a first link engaging the first guide slot and a second link pivotally connected to the first engaging member at a first position spaced apart from the first axis, wherein the first link and the second link may be pivotally connected to one another. Thus, a smooth movement of the links is provided which provides the pivotal movement of the first engaging member with a rather small force.

The first link may be connected to a first link biasing member configured to bias the first link in a direction inclined with respect to the centerline of the guide rail and away from the second link. Thus, a kind of automatic guiding is provided.

The lifting device may further comprise a second support member connected to the at least one biasing member and mounted to the guide rail, and a second engaging member configured to engage the immersion tube holder, wherein the second engaging member may be arranged adjacent an upper end of the guide rail, wherein the second engaging member may be configured to releasably lock the immersion tube holder and to integrally move the immersion tube into the lifted position when engaged therewith. The immersion tube holder safely supports or carries the immersion tube similar to a slide. Thus, the immersion tube is safely guided. The first engaging member allows to temporarily engage the immersion tube holder and to soften the movement of the immersion tube holder by means of locking the same. When the immersion tube holder is engaged and locked by the second engaging member, both concertedly move towards the lifted position with an even and smooth movement.

The second engaging member may be pivotable around a second axis being perpendicular with respect to a centerline of the guide rail. Thus, the immersion tube holder may be reliably locked by means of a pivotal movement of the second engaging member.

The second axis may be spaced apart from the centerline of the guide rail. Thus, a torque is caused around the second axis, which facilitates the pivotal movement and the locking of the second engaging member.

The immersion tube holder may comprise a second pin or roller, wherein the second engaging member may comprise a second slot configured to engage the second pin or roller. Thus, the second pin or roller may be reliably inserted into the second slot which provides a guiding of the second pin or roller. Thereby, the locking operation may be carried out in a reliable manner.

The second slot may be formed at least partially inclined with respect to the centerline of the guide rail such that the second engaging member is configured to be rotated around the second axis when engaging the second pin or roller. Thus, the insertion of the second pin or roller into the second slot is facilitated. Further, the inclination of the second slot increases the torque acting on the second axis.

The automatic analyzer may further comprise a second slotted guide member comprising a second guide slot and being arranged adjacent to the upper end of the guide rail and a second link assembly engaging the second guide slot and pivotally connected to the second engaging member, wherein the second guide slot may comprise a third slot portion being substantially parallel to the centerline of the guide rail and a fourth slot portion being substantially perpendicular to the centerline of the guide rail. Thus, the pivotal movement of the second engaging member is facilitated and automatically initiated as soon as the second engaging member engages the immersion tube holder.

The second link assembly may comprise a third link engaging the second guide slot and a fourth link pivotally connected to the second engaging member at a second position spaced apart from the second axis, wherein the third link and the fourth link may be pivotally connected to one another. Thus, a smooth movement of the links is provided which provides the pivotal movement of the second engaging member with a rather small force.

The third link may be connected to a second link biasing member configured to bias the third link in a direction inclined with respect to the centerline of the guide rail and away from the fourth link. Thus, a kind of automatic guiding is provided.

The second support member may be moveably mounted to the guide rail and the at least one biasing member may be configured to bias the immersion tube towards the lifted position with a predetermined biasing force. Thus, a faulty operation for a user is reliably prevented as the immersion tube is biased or forced into the lifted position where it is locked and the user may not hold the immersion tube at an intermediate position when replacing a reagent vessel.

The automatic analyzer may further comprise a lever member mounted to the second support member and rotatable around a third axis parallel to the second axis, wherein the second engaging member and the lever member may be rotatable in opposite directions. Thus, an alternative mechanism for safely guiding the immersion tube into the lifted position is provided.

The second engaging member may be connected to a first gear, wherein the lever member may be connected to a second gear, wherein the first gear and the second gear may engage with one another. Thus, a reliable mechanism for pivoting the second engaging member is provided.

The automatic analyzer may further comprise a lever biasing member connected to the lever member and to the second engaging member. The lever biasing member may be configured to bias the immersion tube towards the lifted position with a predetermined biasing force. Thus, the lever member and the second engaging member may be biased into predetermined positions.

The lever biasing member may be configured to provide a biasing force to the lever member and the second engaging member in a direction of its two connection points towards one another. Thereby, the second engaging member may be biased into a position configured to lock the immersion tube in the lifted position. Thus, this kind of lock is designed in a way that it will lock the immersion tube safely in the lifted position but can be easily unlocked by the operator or user to lower the immersion tube again after the reagent vessel has been exchanged.

The automatic analyzer may further comprise a guide pulley arranged adjacent the lower end of the guide rail and configured to turn the at least one biasing member round. Thus, the characteristic of the biasing member may be flattened. Thereby, any abrupt movements of the immersion tube having an excessive acceleration may be avoided.

The at least one biasing member may be a spring. Thus, the biasing effect may be realized by a rather simple and well established constructional member which decreases the manufacturing costs.

The automatic analyzer may further comprise a sealing member arranged at the immersion tube and configured to seal an opening of the reagent vessel by engaging a rim of the opening. The sealing member may be a sealing ring. Thus, any evaporation of the reagent may be reliably prevented as the sealing member is pressed onto the rim in a gas tight manner.

The automatic analyzer may further comprise a bellows connected to the immersion tube with a first end of the bellows being fixed to the immersion tube and a second end of the bellows being moveable with respect to the immersion tube. In this respect, it has to be noted that many reagent vessels commercially available have varying outer heights and/or varying bottom thickness involving varying inner heights. In this respect, the inner height may be defined from the opening at the neck of the reagent vessel to the inner surface of the bottom of the reagent vessel which faces the opening. Thus, if the distance of the sealing member stationary fixed at the immersion tube situations to the leading end of the immersion tube is constant, situations may occur where the sealing member is pressed onto the rim defining the reagent vessel opening but the leading end of the immersion tube is spaced apart from the bottom of the reagent vessel which causes loss of reagent or the leading end of the immersion tube contacts the bottom of the reagent vessel but the sealing member is spaced apart of the rim defining the reagent vessel opening which causes a leakage of potential hazardous reagent vapor into the environment.

With the provision of a bellows having only one end fixed to the immersion tube, a contact of the immersion tube and the bottom of the reagent vessel is reliably ensured increasing the amount of reagent available from the reagent vessel as well as an excessive distance from the immersion to the bottom of the reagent vessel causing an excessive loss of reagent due to a dead volume thereof will be avoided. Further, a reliable engagement of the sealing member with the rim defining the reagent vessel opening is realized. The bellows allows to adapt the effective length of the immersion tube to the inner height of the reagent vessel due to the relative movability.

The bellows may be arranged at the immersion tube at a position which is outside of the reagent vessel when the immersion tube is at its lowered position. Thus, a contact of the reagent and the bellows is avoided.

Alternatively, the bellows may be arranged at the immersion tube at a position which is inside of the reagent vessel when the immersion tube is at its lowered position. Thus, the constructional space above the reagent vessel may be decreased.

The bellows may be connected to or integrally formed with the sealing member. Thus, the sealing effect as well as the height compensation of the reagent vessel may be realized by means of a single constructional member.

The bellows may be at least partially made of a fluoropolymer, typically PTFE, or steel. Such materials prevent any leachables and extractables into the reagent.

The sealing member may comprise a ventilation orifice. Thus, a negative pressure within the reagent vessel during retrieving the reagent by means of the immersion tube is prevented.

The ventilation orifice may be provided with a filter member or the like. Such a filter member is provided in order to avoid leakage of potential hazardous vapors from the reagent and/or deterioration of the reagent caused by contamination with the incoming air.

Further disclosed and proposed herein is a computer program including computer-executable instructions for performing the method or operation of the apparatus according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: An automatic analyzer for analyzing samples, comprising
- an immersion tube configured to retrieve a reagent stored in a reagent vessel,
- a lifting device configured to lift and to lower the immersion tube, wherein the lifting device comprises
  - a guide rail on which the immersion tube is slidably moveable between a lowered position, in which the immersion tube is configured to be immersed into the reagent vessel, and a lifted position, in which the immersion tube is configured to be retracted from the reagent vessel, and
  - at least one biasing member configured to bias the immersion tube towards the lowered position with a predetermined biasing force,
- a detector configured to detect an identity of the reagent, and
- a locking device configured to lock the immersion tube in the lifted position and to allow the immersion tube to be moved towards the lowered position only if the identity of the reagent detected by the detector corresponds to a target identity of the reagent.

Embodiment 2: The automatic analyzer according to embodiment 1, wherein the detector is a RFID reader configured to detect the identity of the reagent by means of a RFID tag located at the reagent vessel or the detector is a barcode reader configured to detect the identity of the reagent by means of a barcode located at the reagent vessel.

Embodiment 3: The automatic analyzer according to embodiment 1 or 2, wherein the lifting device further comprises an immersion tube holder holding the immersion tube and moveably mounted to the guide rail, a first support member connected to the at least one biasing member and moveably mounted to the guide rail, and a first engaging member configured to engage the immersion tube holder, wherein the first engaging member is arranged adjacent a lower end of the guide rail, wherein the first engaging member is configured to releasably lock the immersion tube holder and to integrally move the immersion tube into the lowered position when engaged therewith.

Embodiment 4: The automatic analyzer according to embodiment 3, wherein the first engaging member is pivotable around a first axis being perpendicular with respect to a centerline of the guide rail.

Embodiment 5: The automatic analyzer according to embodiment 4, wherein the first axis is spaced apart from the centerline of the guide rail.

Embodiment 6: The automatic analyzer according to embodiment 4 or 5, wherein the immersion tube holder comprises a first pin or roller, wherein the first engaging member comprises a first slot configured to engage the first pin or roller.

Embodiment 7: The automatic analyzer according to embodiment 6, wherein the first slot is formed at least partially inclined with respect to the centerline of the guide rail such that the first engaging member is configured to be rotated around the first axis when engaging the first pin or roller.

Embodiment 8: The automatic analyzer according to any one of embodiments 4 to 7, further comprising a first slotted guide member comprising a first guide slot and being arranged adjacent to the lower end of the guide rail and a first link assembly engaging the first guide slot and pivotally connected to the first engaging member, wherein the first guide slot comprises a first slot portion being substantially parallel to the centerline of the guide rail and a second slot portion being substantially perpendicular to the centerline of the guide rail.

Embodiment 9: The automatic analyzer according to embodiment 8, wherein the first link assembly comprises a first link engaging the first guide slot and a second link pivotally connected to the first engaging member at a first position spaced apart from the first axis, wherein the first link and the second link are pivotally connected to one another.

Embodiment 10: The automatic analyzer according to embodiment 9, wherein the first link is connected to a first link biasing member configured to bias the first link in a direction inclined with respect to the centerline of the guide rail and away from the second link.

Embodiment 11: The automatic analyzer according to embodiment 10, wherein the lifting device further comprises a second support member connected to the at least one biasing member and mounted to the guide rail, and a second engaging member configured to engage the immersion tube holder, wherein the second engaging member is arranged adjacent an upper end of the guide rail, wherein the second engaging member is configured to releasably lock the immersion tube holder and to integrally move the immersion tube into the lifted position when engaged therewith.

Embodiment 12: The automatic analyzer according to embodiment 11, wherein the second engaging member is pivotable around a second axis being perpendicular with respect to a centerline of the guide rail.

Embodiment 13: The automatic analyzer according to embodiment 12, wherein the second axis is spaced apart from the centerline of the guide rail.

Embodiment 14: The automatic analyzer according to embodiment 12 or 13, wherein the immersion tube holder comprises a second pin or roller, wherein the second engaging member comprises a second slot configured to engage the second pin or roller.

Embodiment 15: The automatic analyzer according to embodiment 14, wherein the second slot is formed at least partially inclined with respect to the centerline of the guide rail such that the second engaging member is configured to be rotated around the second axis when engaging the second pin or roller.

Embodiment 16: The automatic analyzer according to any one of embodiments 12 to 15, further comprising a second slotted guide member comprising a second guide slot and being arranged adjacent to the upper end of the guide rail and a second link assembly engaging the second guide slot and pivotally connected to the second engaging member, wherein the second guide slot comprises a third slot portion being substantially parallel to the centerline of the guide rail and a fourth slot portion being substantially perpendicular to the centerline of the guide rail.

Embodiment 17: The automatic analyzer according to embodiment 16, wherein the second link assembly comprises a third link engaging the second guide slot and a fourth link pivotally connected to the second engaging member at a second position spaced apart from the second axis, wherein the third link and the fourth link are pivotally connected to one another.

Embodiment 18: The automatic analyzer according to embodiment 17, wherein the third link is connected to a second link biasing member configured to bias the third link in a direction inclined with respect to the centerline of the guide rail and away from the fourth link.

Embodiment 19: The automatic analyzer according to any one of embodiments 11 to 18, wherein the second support member is moveably mounted to the guide rail, wherein the at least one biasing member is configured to bias the immersion tube towards the lifted position with a predetermined biasing force.

Embodiment 20: The automatic analyzer according to any one of embodiments 13 to 15, further comprising a lever member mounted to the second support member and rotatable around a third axis parallel to the second axis, wherein the second engaging member and the lever member are rotatable in opposite directions.

Embodiment 21: The automatic analyzer according to embodiment 20, wherein the second engaging member is connected to a first gear, wherein the lever member is connected to a second gear, wherein the first gear and the second gear engage with one another.

Embodiment 22: The automatic analyzer according to embodiment 20 or 21, further comprising a lever biasing member connected to the lever member and to the second engaging member wherein the lever biasing member is configured to bias the immersion tube towards the lifted position with a predetermined biasing force.

Embodiment 23: The automatic analyzer according to embodiment 22, wherein the lever biasing member is configured to provide a biasing force to the lever member and the second engaging member in a direction of its two connection points towards one another.

Embodiment 24: The automatic analyzer according to any one of embodiments 1 to 23, further comprising a guide pulley arranged adjacent the lower end of the guide rail and configured to turn the at least one biasing member round.

Embodiment 25: The automatic analyzer according to any one of embodiments 1 to 24, wherein the at least one biasing member is a spring.

Embodiment 26: The automatic analyzer according to any one of embodiments 1 to 25, further comprising a sealing member arranged at the immersion tube and configured to seal an opening of the reagent vessel by engaging a rim of the opening.

Embodiment 27: The automatic analyzer according to any one of embodiments 1 to 26, further comprising a bellows connected to the immersion tube with a first end of the bellows being fixed to the immersion tube and a second end of the bellows being moveable with respect to the immersion tube.

Embodiment 28: The automatic analyzer according to embodiment 27, wherein the bellows is arranged at the immersion tube at a position which is outside of the reagent vessel when the immersion tube is at its lowered position.

Embodiment 29: The automatic analyzer according to embodiment 27, wherein the bellows is arranged at the immersion tube at a position which is inside of the reagent vessel when the immersion tube is at its lowered position.

Embodiment 30: The automatic analyzer according to any one of embodiments 27 to 29, wherein the bellows is connected to or integrally formed with the sealing member.

Embodiment 31: The automatic analyzer according to any one of embodiments 27 to 30, wherein the bellows is at least partially made of a fluoropolymer, typically PTFE, or steel.

Embodiment 32: The automatic analyzer according to any one of embodiments 26 to 31, wherein the sealing member comprises a ventilation orifice.

In order that the embodiments of the present disclosure may be more readily understood, reference is made to the following examples, which are intended to illustrate the disclosure, but not limit the scope thereof.

FIG. 1 shows a schematic illustration of an automatic analyzer 100 according to an embodiment of the present disclosure. Particularly, FIG. 1 shows a cross-sectional view of the automatic analyzer 100. The automatic analyzer 100 is configured to analyze samples. The automatic analyzer 100 comprises a housing 102. The housing 102 at least partially encloses at least one analyzing instrument 104. For example, several analyzing instruments 104 may be present such as two, three or even more. The analyzing instruments 104 are configured to carry out analytical processes of the samples. The automatic analyzer 100 is configured to be loaded with at least one reagent vessel 106. Needless to say, the automatic analyzer 100 may be loaded with a plurality of reagent vessels 106 such as two, three or even more. Needless to say, each analytical instrument 104 may be supplied with reagent from more than one reagent vessel 106. The automatic analyzer 100 further comprises a detector 108 configured to detect an identity of the reagent stored in the reagent vessel 106. The detector 108 is a RFID reader configured to detect the identity of the reagent by means of a RFID tag (not shown in detail) located at the reagent vessel 108. For example, the RFID tag may be attached to an outer surface of the reagent vessel 106. Alternatively, the detector 108 may be a bar-code reader configured to detect the identity of the reagent by means of a barcode located at the reagent vessel 106. The automatic analyzer 100 further comprises an immersion tube 110 configured to retrieve a reagent stored in the reagent vessel 106. The immersion tube 110 may be made of metal such as stainless steel. The immersion tube 110 is in fluid communication with the analyzing instrument 104. The automatic analyzer 100 further comprises a lifting device 112 configured to lift and to lower the immersion tube 110.

Figure 2:
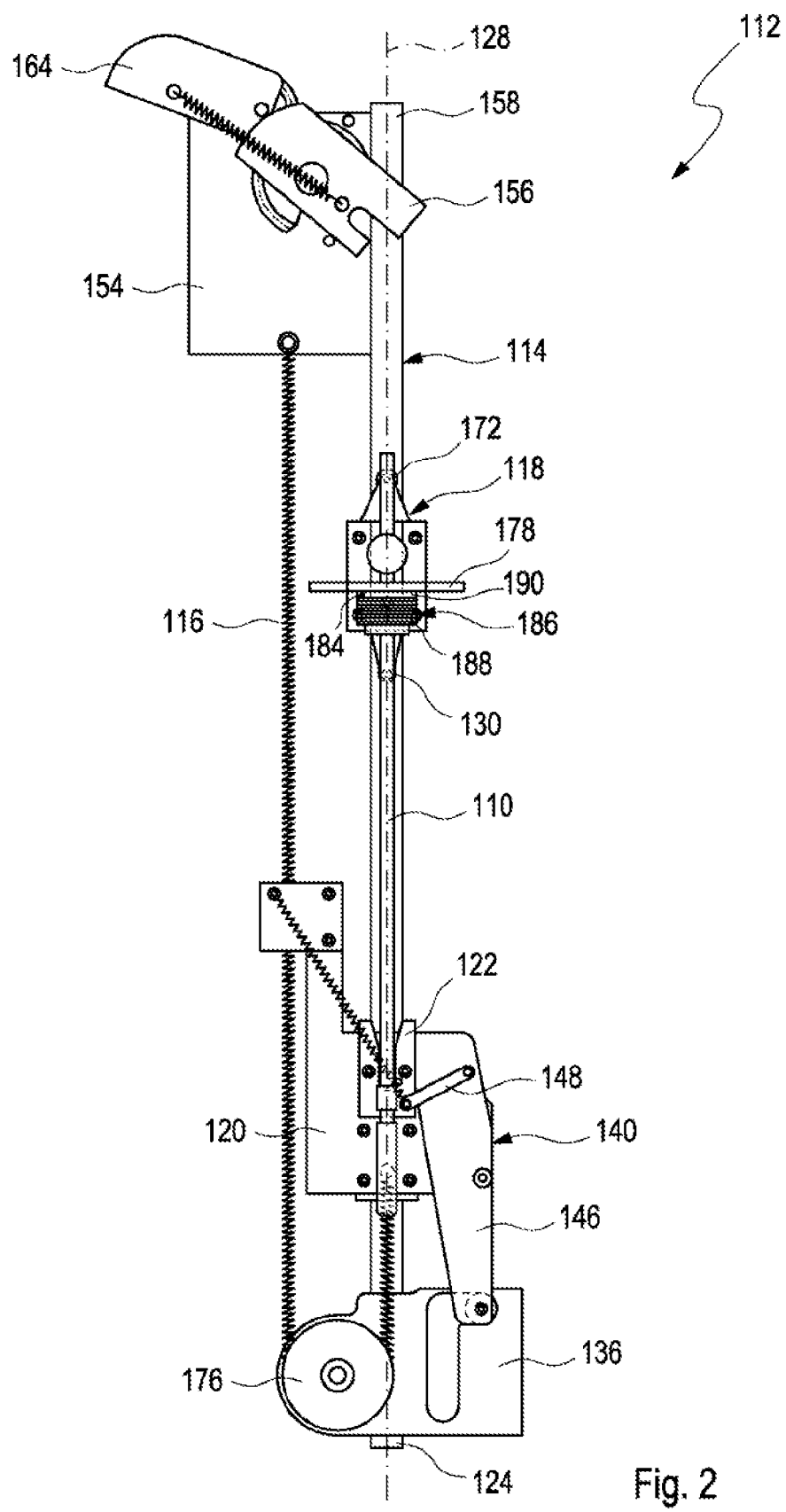
FIG. 2 shows a perspective view of a lifting device.

FIG. 2 shows a perspective view of the lifting device 112. The lifting device 112 comprises a guide rail 114 on which the immersion tube 100 is slidably moveable between a lowered position, in which the immersion tube 110 is configured to be immersed into the reagent vessel 106, and a lifted position, in which the immersion tube 110 is configured to be retracted from the reagent vessel 106. It has to be noted that FIG. 2 shows the immersion tube 110 only partially for explanatory reasons. The guide rail 114 may be a straight rail formed similar to a flattened rod and may be made of metal. The guide rail 114 is typically oriented parallel to a direction of gravity. The lifting device 112 further comprises at least one biasing member 116 configured to bias the immersion tube 110 towards the lowered position with a predetermined biasing force. In the present embodiment, the biasing member 116 is a spring such as a coil spring. The lifting device 112 further comprises an immersion tube holder 118 holding the immersion tube 110 and moveably mounted to the guide rail 114. For example, the immersion tube holder 118 partially encompasses the guided rail 114 so as to be moveably mounted to the guide rail 114 similar to a slide.

Figure 3:
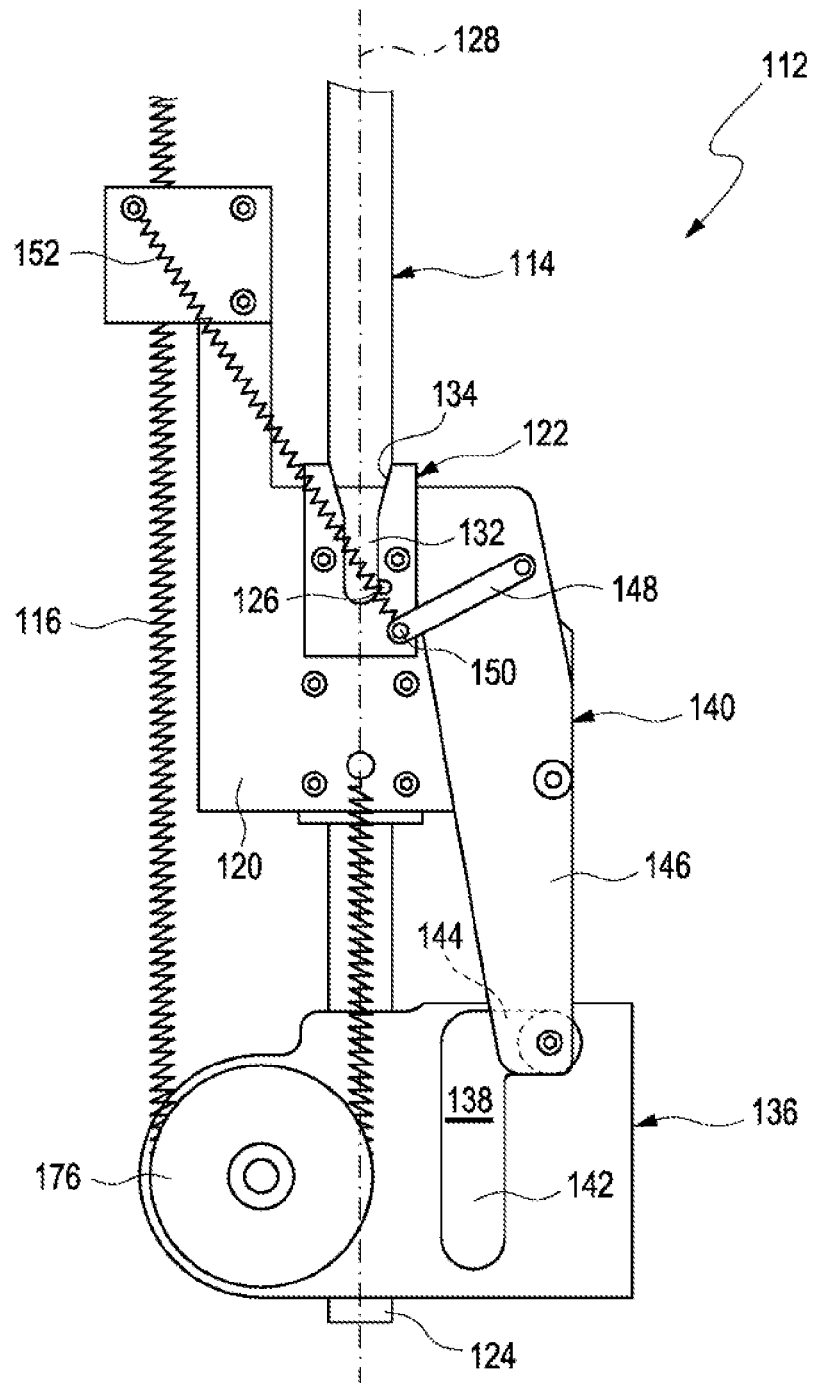
FIG. 3 shows a perspective view of a lower part of the lifting device.

FIG. 3 shows a perspective view of a lower part of the lifting device 112. The lifting device 112 further comprises a first support member 120 connected to the at least one biasing member 116 and moveably mounted to the guide rail 114. The first support member 120 is rather flat and formed similar to a sheet. The lifting device 112 further comprises a first engaging member 122 configured to engage the immersion tube holder 118. The first engaging member 122 is arranged adjacent a lower end 124 of the guide rail 114. The first engaging member 122 is mounted to the first support member 120 and, thus, is integrally moveable with the first support member 120. The first engaging member 122 is configured to releasably lock the immersion tube holder 118 and to integrally move the immersion tube 110 into the lowered position when engaged therewith. The first engaging member 122 is pivotable around a first axis 126 being perpendicular with respect to a centerline 128 of the guide rail 114. Particularly, the first axis 126 is spaced apart from the centerline 128 of the guide rail 114.

Figure 4:
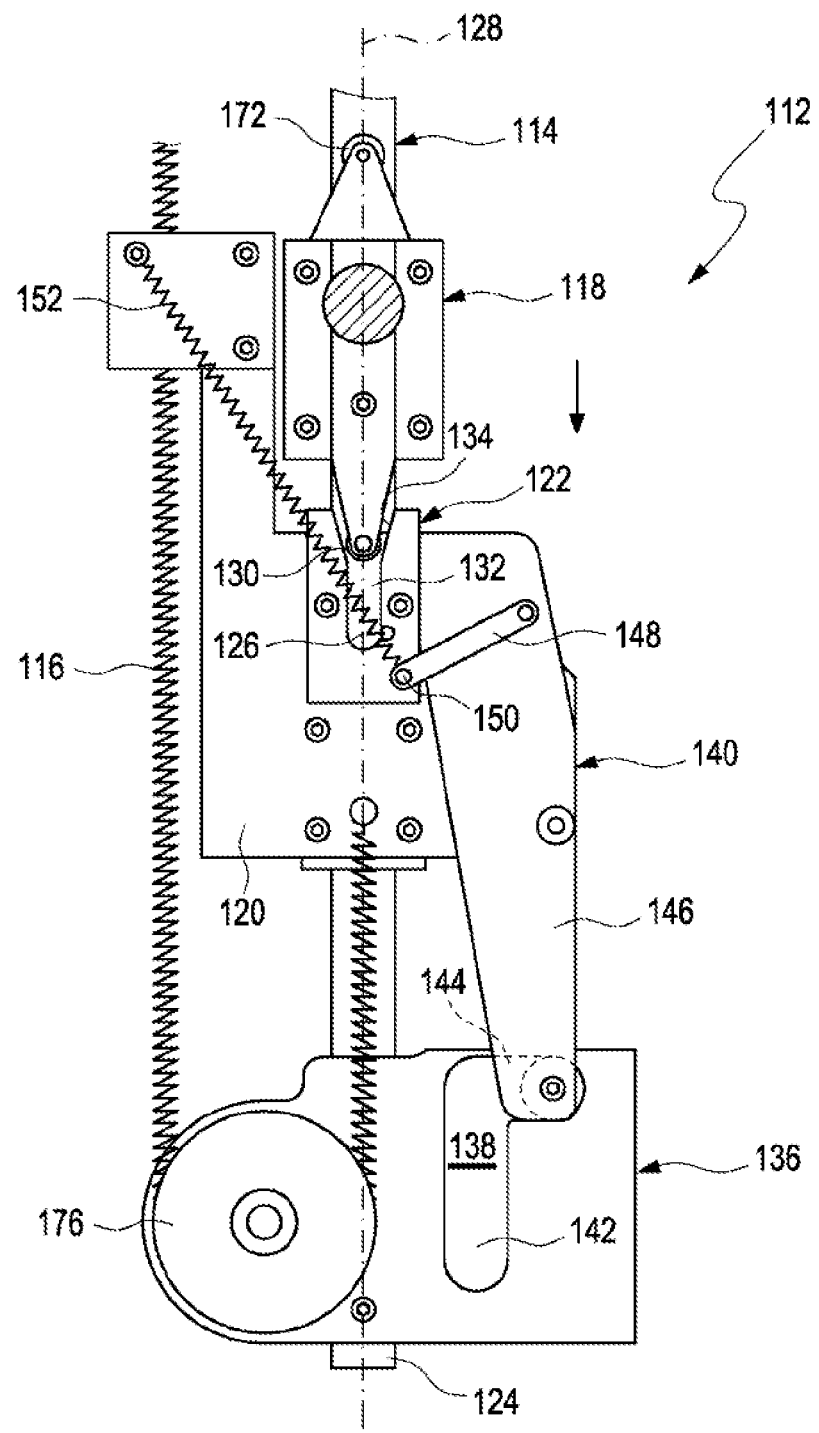
FIG. 4 shows a perspective view of the lower part of the lifting device in an operation state.
Figure 5:
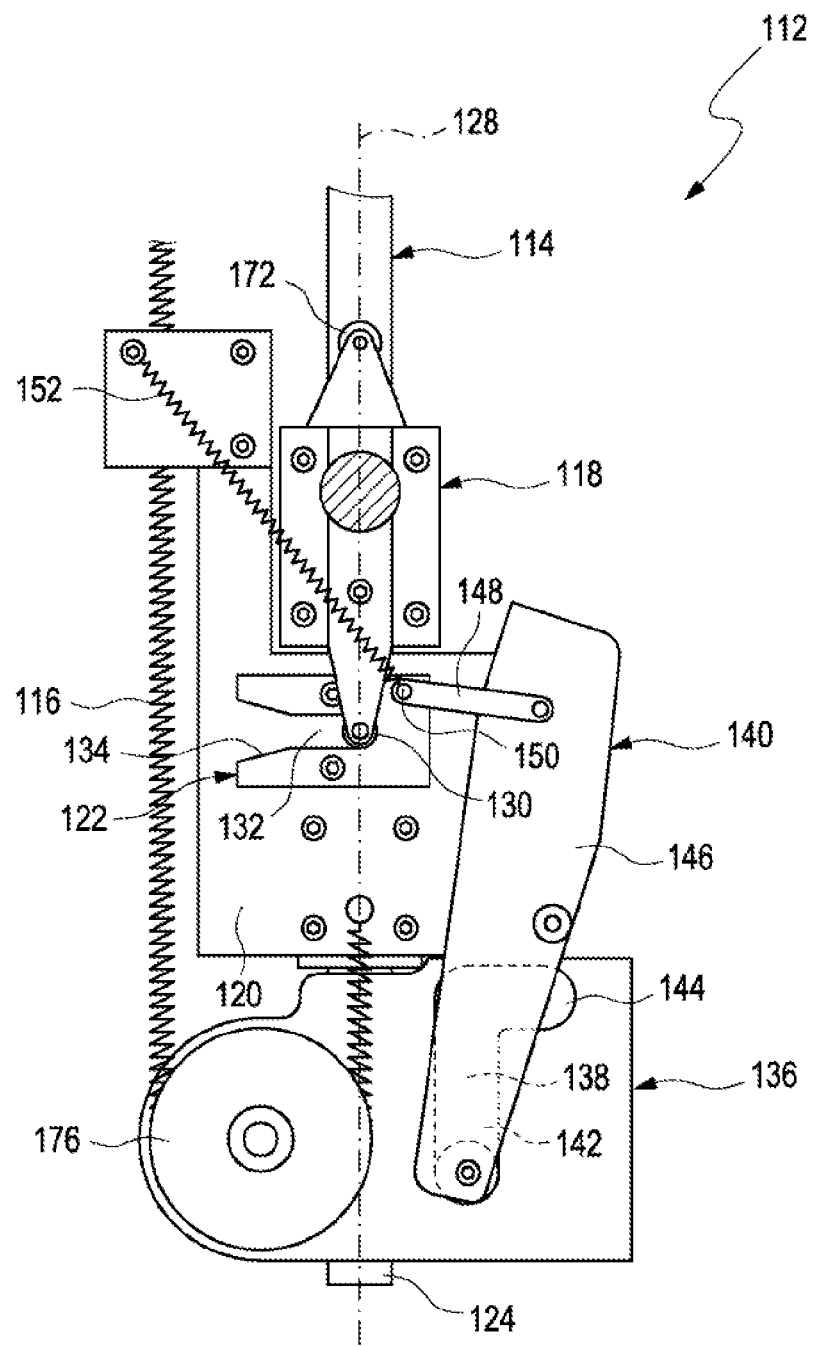
FIG. 5 shows a perspective view of the lower part of the lifting device in another operation state.
Figure 6:
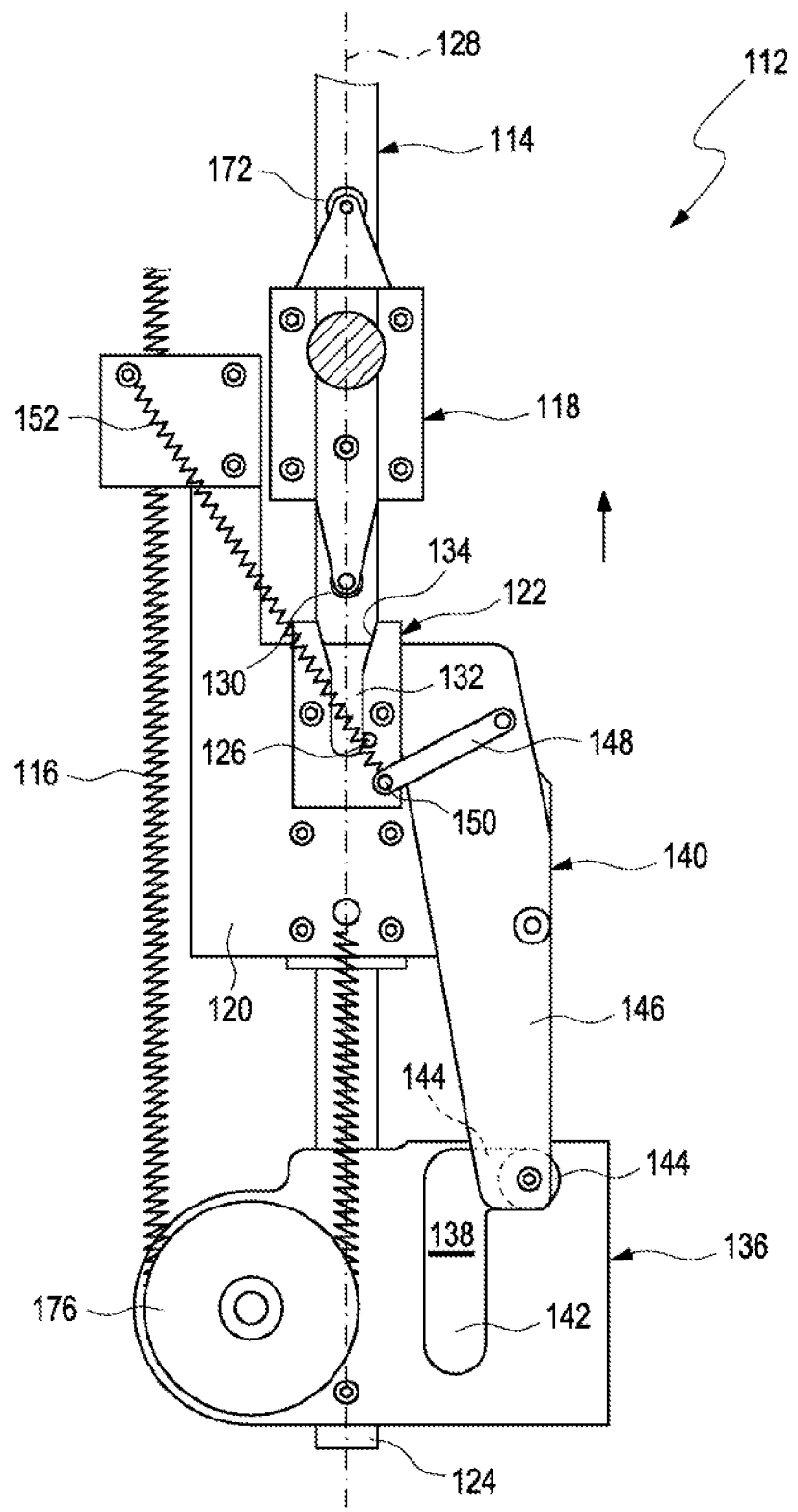
FIG. 6 shows a perspective view of the lower part of the lifting device in another operation state.

FIG. 4 shows a perspective view of the lower part of the lifting device 112 in an operation state. FIGS. 5 and 6 show perspective view of the lower part of the lifting device 112 in different or other operation states. The immersion tube holder 118 comprises a first pin or roller 130. The first engaging member 122 comprises a first slot 132 configured to engage the first pin or roller 130. Particularly, the first slot 132 is formed at least partially inclined with respect to the centerline 128 of the guide rail 114 such that the first engaging member 122 is configured to be rotated around the first axis 126 when engaging the first pin or roller 130. For example, the first slot 132 comprises a first tapered inlet portion 134 facing the first pin or roller 130.

The automatic analyzer 100 further comprises a first slotted guide member 136 comprising a first guide slot 138 and being arranged adjacent to or at the lower end 124 of the guide rail 114 and a first link assembly 140 engaging the first guide slot 138 and pivotally connected to the first engaging member 122. In the present embodiment, the first slotted guide member 136 is arranged at the lower end 124 of the guide rail 114. In any case, the first slotted guide member 136 is arranged closer to the lower end 124 of the guide rail 114 than the first support member 120. The first guide slot 138 comprises a first slot portion 142 being substantially parallel to the centerline 128 of the guide rail 114 and a second slot portion 144 being substantially perpendicular to the centerline 128 of the guide rail 114. The first slot portion 142 and the second slot portion 144 transition into one another. The first link assembly 140 comprises a first link 146 engaging the first guide slot 138 and a second link 148 pivotally connected to the first engaging member 122 at a first position 150 spaced apart from the first axis 126. The first link 146 and the second link 148 may be rod-shaped or like a small plate. The first link 146 and the second link 148 are pivotally connected to one another. Further, the second link 148 is connected to a first link biasing member 152 configured to bias the second link 148 in a direction inclined with respect to the centerline 128 of the guide rail 114 and away from the first link 146. The first link 146 engages the first guide slot 138 by means of a roller or the like.

Figure 7:
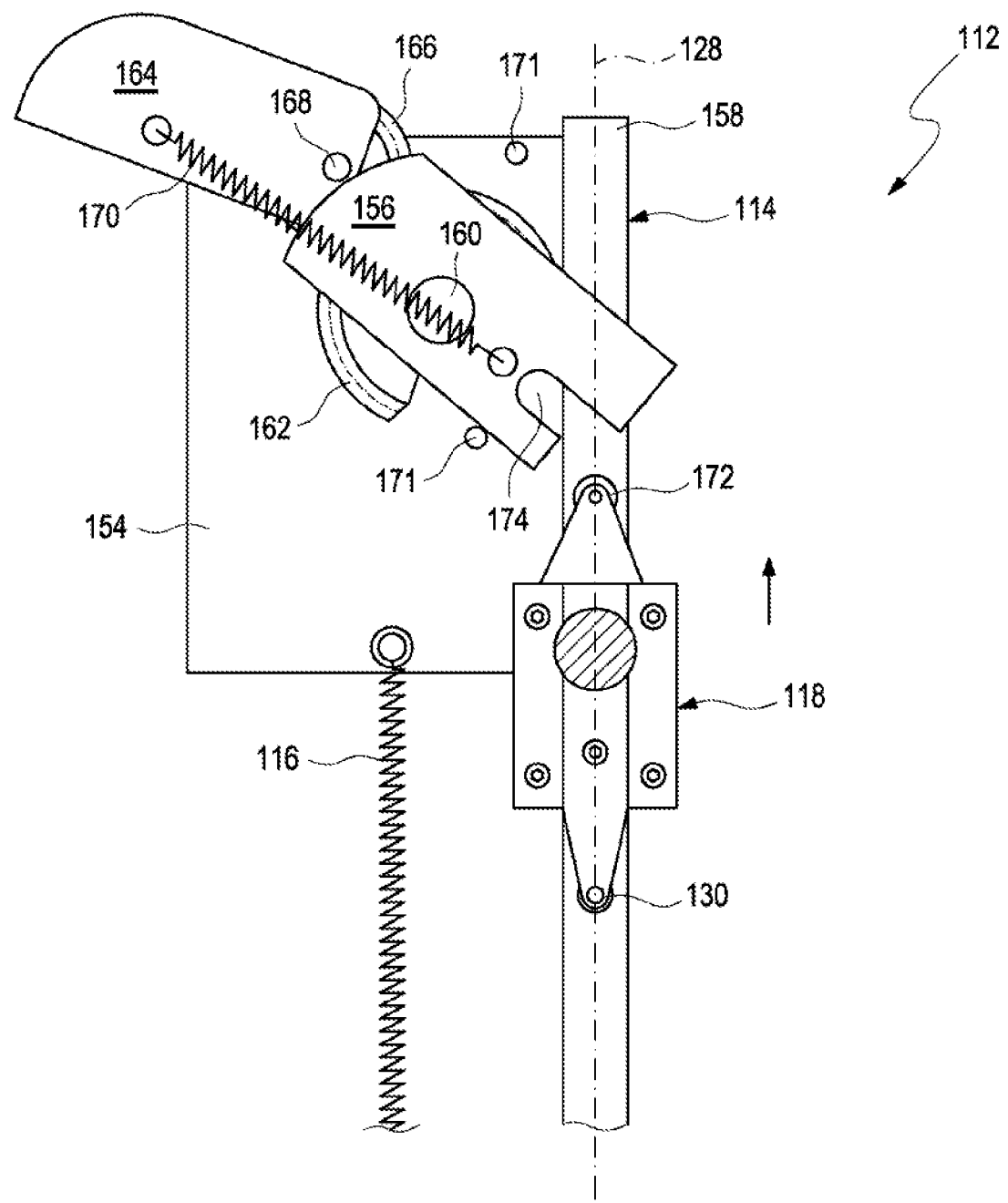
FIG. 7 shows a perspective view of the upper part of the lifting device in an operation state.
Figure 8:
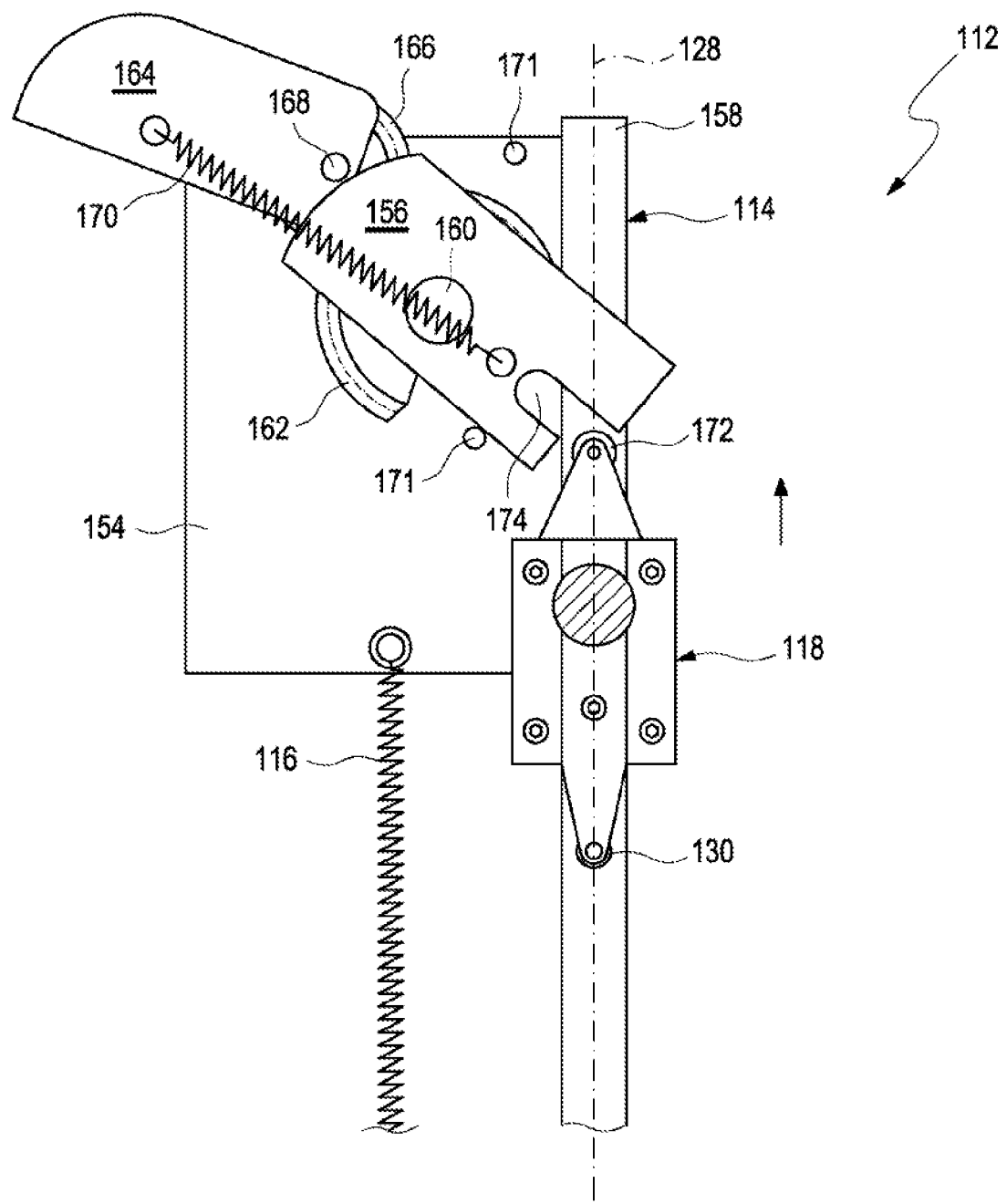
FIG. 8 shows a perspective view of an upper part of the lifting device.
Figure 9:
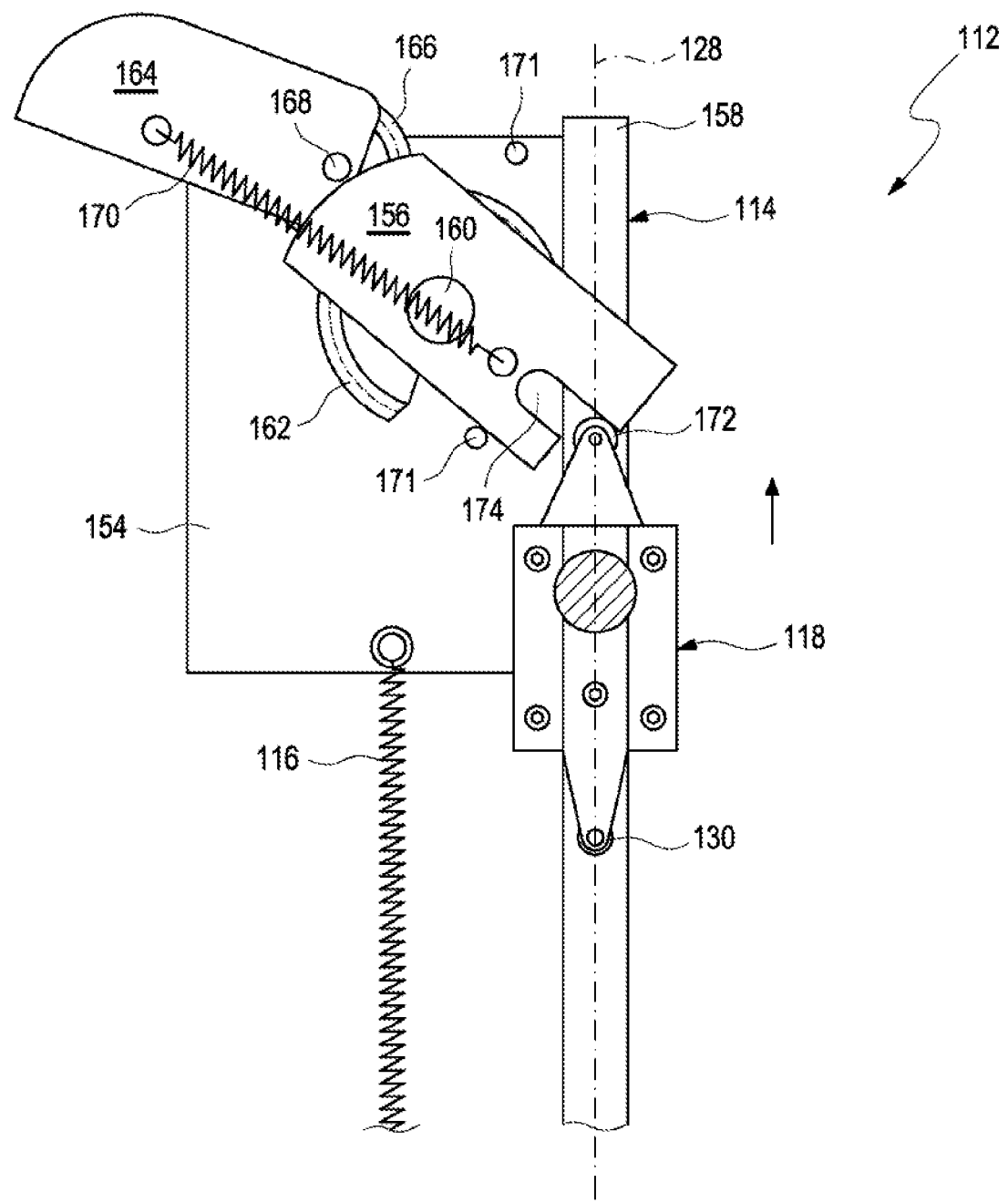
FIG. 9 shows a perspective view of the upper part of the lifting device in an operation state.
Figure 10:
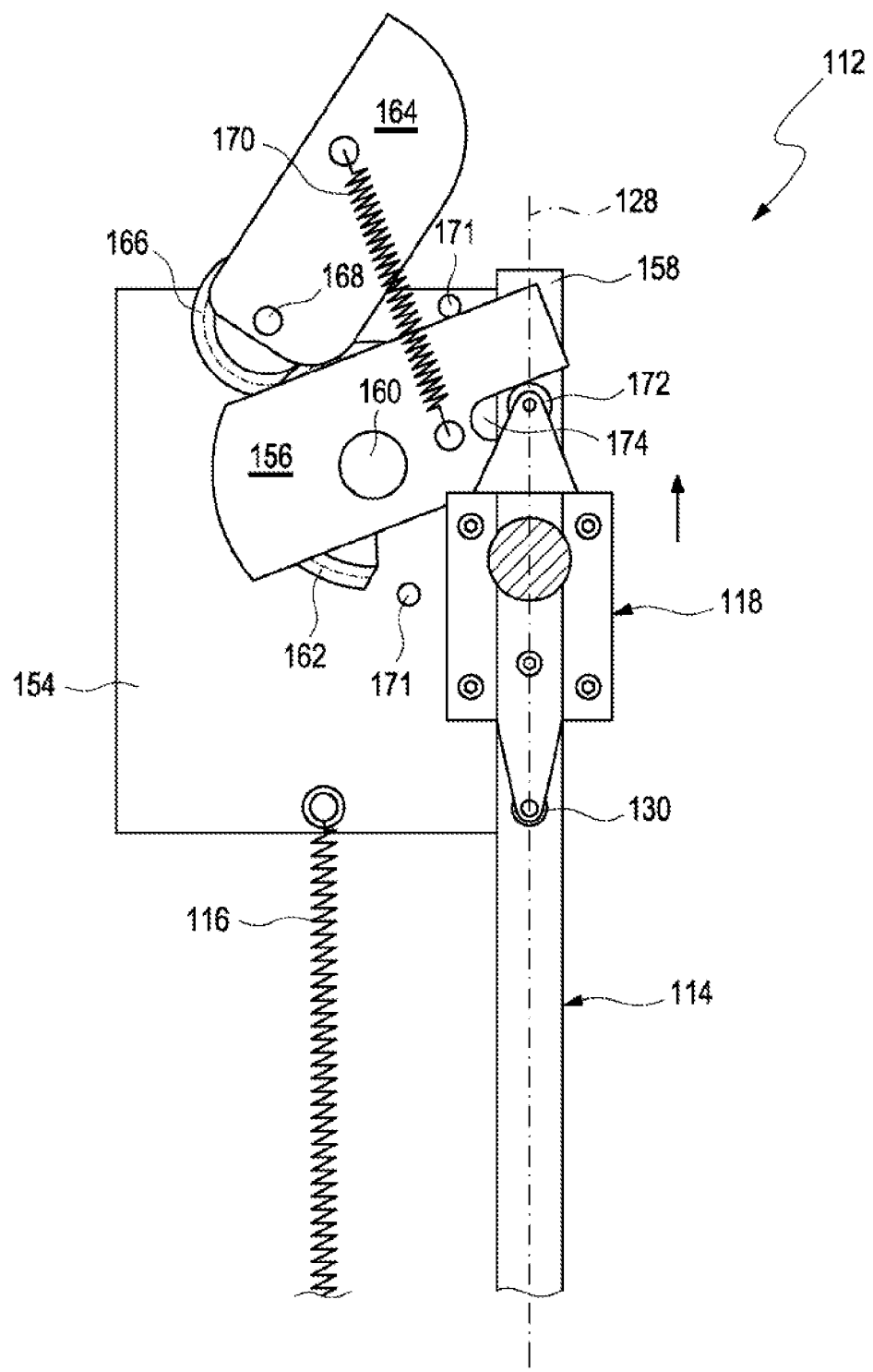
FIG. 10 shows a perspective view of the upper part of the lifting device in another operation state.
Figure 11:
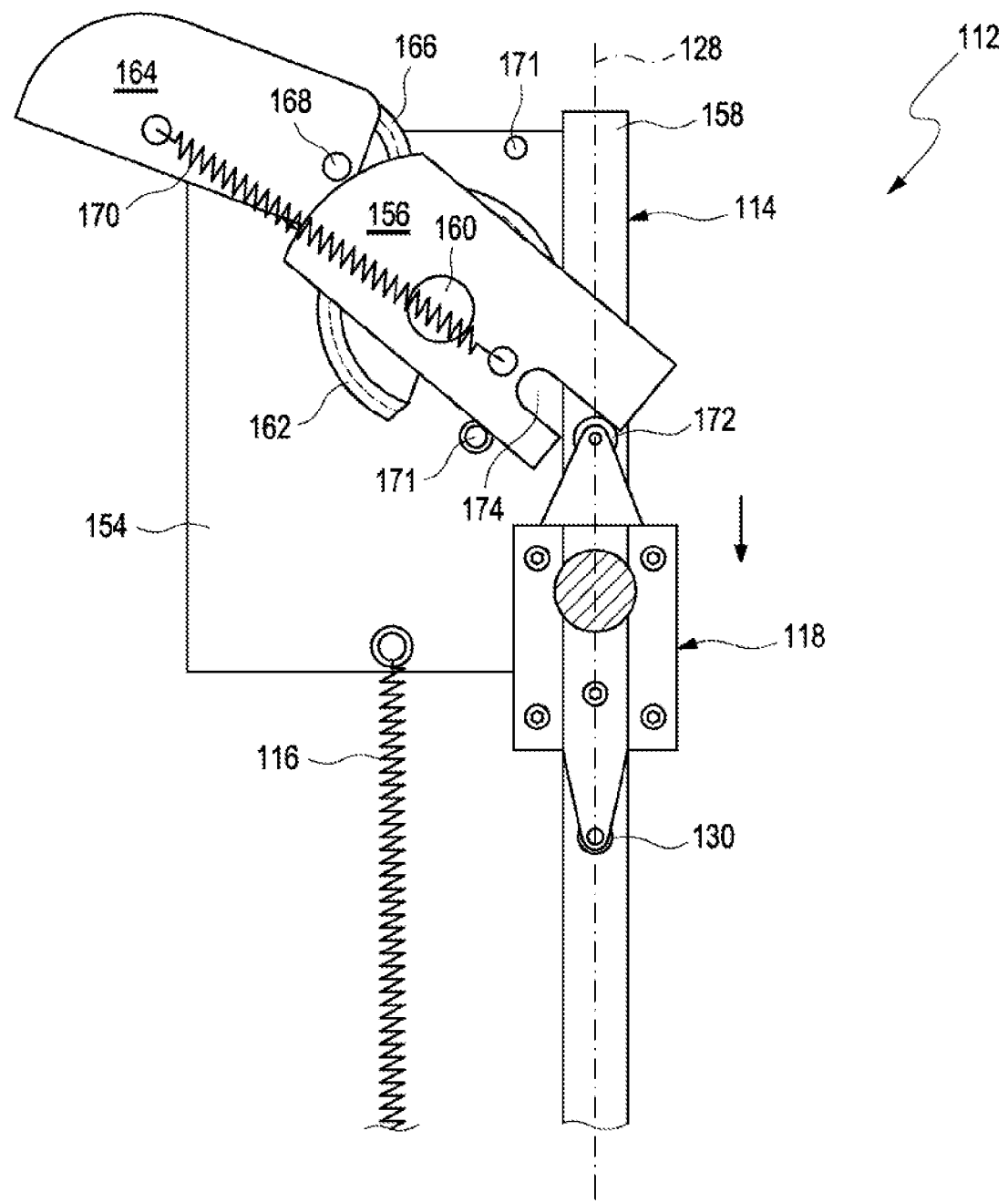
FIG. 11 shows a perspective view of the upper part of the lifting device in another operation state.

FIG. 7 shows a perspective view of an upper part of the lifting device 112 in an operation state. FIG. 8 shows a perspective view of the upper part of the lifting device 112 in another operation state. FIG. 9 shows a perspective view of the upper part of the lifting device 112 in another operation state. FIG. 10 shows a perspective view of the upper part of the lifting device 112 in another operation state. FIG. 11 shows a perspective view of the upper part of the lifting device 112 in another operation state. The lifting device 112 further comprises a second support member 154 connected to the at least one biasing member 116 and stationary mounted to the guide rail 114. The lifting device 112 further comprises a second engaging member 156 configured to engage the immersion tube holder 118. The second engaging member 156 is arranged adjacent an upper end 158 of the guide rail 114. The second engaging member 156 is mounted to the second support member 154. The at least one biasing member 116 is connected to the second support member 154. For example, the at least one biasing member 116 is connected to the second support member 154 at a position adjacent end edge facing the lower end 124 of the guide rail 114. The second engaging member 156 is configured to releasably lock the immersion tube holder 118 and to move the immersion tube 110 into the lifted position when engaged therewith. The second engaging member 156 is pivotable around a second axis 160 being perpendicular with respect to a centerline 128 of the guide rail 114. The second axis 160 is spaced apart from the centerline 128 of the guide rail 114. Particularly, the second engaging member 156 is connected to a first gear 162 and integrally rotatable therewith around the second axis 160.

Further, a lever member 164 is mounted to the to the second support member 154. The lever member 164 is connected to a second gear 166 and integrally rotatable therewith around a third axis 168. The third axis 168 is parallel to the second axis 160. The first gear 162 and the second gear 166 engage or mesh with one another. Thus, the second engaging member 156 and the lever member 164 are rotatable in opposite directions. Further, a lever biasing member 170 is connected to the lever member 164 at a position spaced apart from the third axis 168 and to the second engaging member 156 at a position spaced apart from the second axis 160. The lever biasing member 170 is configured to bias the immersion tube 110 towards the lifted position with a predetermined biasing force. Further, the second support member 154 comprises at least one stopper member 171 configured to limit a rotational or pivotal movement of the second engagement member 156. In the present embodiment, there are two stopper members 171. The stopper members 171 are formed as protrusions or pins protruding from the second support member 154. The stopper members 171 are arranged at the second support member 154 on opposite sides of the second engagement member 156. Particularly, one stopper member 171 is located above the second engagement member 156 and the other stopper member 171 is located below the second engagement member 156 with respect to the centerline 128 of the guide rail 114. As shown in FIGS. 7 and 8, when the immersion tube 110 and the immersion tube holder 118, respectively, are not in the lifted position, the second engagement member 156 engages the lower stopper member 171. As shown in FIG. 10, when the immersion tube 110 and the immersion tube holder 118, respectively, are in the lifted position, the second engagement member 156 engages the upper stopper member 171. Thus, the stopper members 171 limit a rotational or pivotal movement of the second engagement member 156. The position of the stopper members 171 provides that the angle between the second slot 174 of the second engaging member 156 and the centerline 128 of the guide rail 144 in the rotated position of the second engagement member 156 when engaging the second pin or roller 172 becomes too small. If this angle was too small, then the immersion tube holder 118 and the second pin or roller 172 may not be released from the second engagement member 156. Basically, only one stopper member 171 may be present. For example, the second engagement member 156 may comprise a depression, slot or hole at least in a surface facing the second support member 154 which is engaged by a single stopper member 171 protruding from the second support member 154. Thus, the stopper member 171 is located within the depression, slot or hole of the second support member 154 and engages the walls or edges defining the depression, slot or hole.

The immersion tube holder 118 comprises a second pin or roller 172. The second engaging member 156 comprises a second slot 174 configured to engage the second pin or roller 172. The second slot 174 is formed at least partially inclined with respect to the centerline 128 of the guide rail 114 such that the second engaging member 156 is configured to be rotated around the second axis 160 when engaging the second pin or roller 172. One of the walls defining the second slot 174 which faces the lower end 124 of the guide rail 114 is shorter than the opposing wall. The lever biasing member 170 is connected to the second engaging member 156 at a position located between the second axis 160 and a rear end of the second slot 174. The lever biasing member 170 provides a biasing force to the lever member 164 and the second engaging member 156 in a direction of the two connection points towards one another. The two connection points for the lever biasing member 170 are arranged such that in the initial state of the lever biasing member 170 shown in FIGS. 7 to 9, an imaginary line connecting the two connection points does not intersect with the second axis 160 but passes slightly below thereof. Thereby, the lever biasing member 170 is stable in both final rotational positions.

Referring again to FIG. 2, the automatic analyzer 100 further comprises a guide pulley 176 arranged adjacent the lower end 124 of the guide rail 114 and configured to turn the at least one biasing member 116 round. A rotation axis of the guide pulley 176 may be perpendicular to the centerline 128 of the guide rail 114. In the present embodiment, the rotation axis is perpendicular to the drawing plane of FIG. 2. Needless to say, the rotation axis may be parallel to the drawing plane of FIG. 2 and perpendicular to the centerline 128 of the guide rail 114.

The automatic analyzer 100 further comprises a sealing member 178 arranged at the immersion tube 110 and configured to seal an opening 180 of the reagent vessel 106 by engaging a rim 182 defining the opening 180. Particularly, with the present embodiment, the sealing member 178 is moveable relative to the immersion tube 110. The sealing member 178 may be a sealing ring as shown in FIG. 2. The sealing member 178 comprises a ventilation orifice 184. The ventilation orifice 184 may be provided with a filter member (not shown in detail) or the like in order to avoid that any vapor from the interior of the reagent vessel 106 gets out of the reagent vessel 106 and/or deterioration of the reagent caused by contamination of the reagent with the incoming air. The automatic analyzer 100 further comprises a bellows 186 connected to the immersion tube 110 with a first end 188 of the bellows 186 being fixed to the immersion tube 110 and a second end 190 of the bellows 186 being moveable with respect to the immersion tube 110. The bellows 186 is arranged at the immersion tube 110 at a position which is inside of the reagent vessel 106 when the immersion tube 110 is at its lowered position. The bellows 186 is connected to or integrally formed with the sealing member 178. The bellows 186 is at least partially made of a polymer, particularly fluoropolymer, or steel. For example, the bellows 186 is made of PTFE. The bellows 186 is compressible or extendible by a distance or length of about 5 to 20 mm.

Figure 12:
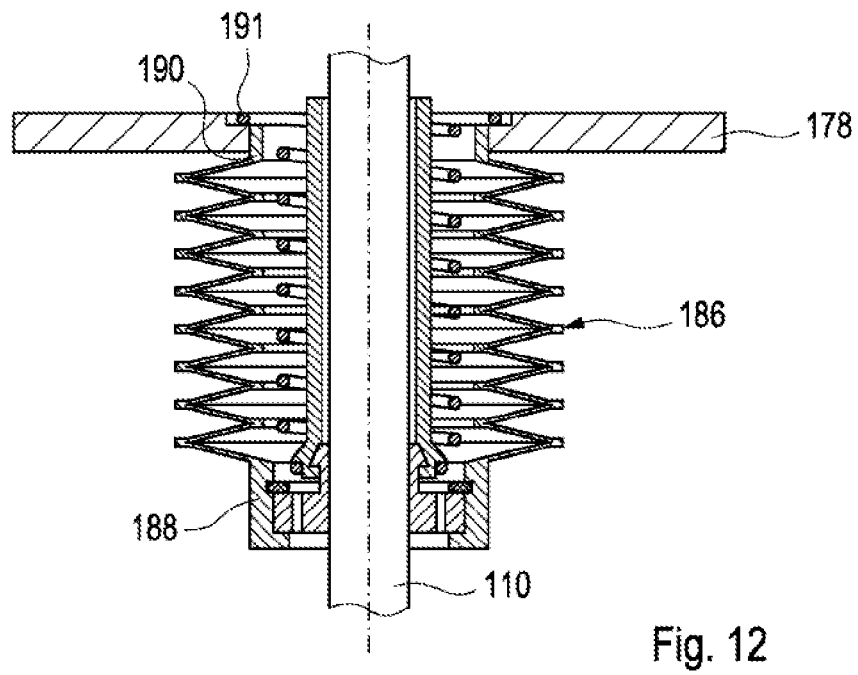
FIG. 12 shows a cross-sectional view of the bellows and the immersion tube.

FIG. 12 shows a cross-sectional view of the bellows 186 and the immersion tube 110. In order to ensure a sufficient sealing force, the bellows 186 may be provided with a bellows biasing member 191 which is configured to bias the sealing member 178 into its sealing position. The provision of such a bellows biasing member 191 is particularly relevant if the bellows 186 is made of a fluoropolymer. The bellows biasing member 191 may be arranged within the bellows 186. As shown in FIG. 12, the bellows 186 is provided at a position which is inside of the reagent vessel 106 when the immersion tube 110 is at its lowered position. In this case, the bellows biasing member 191 is a tension spring or the like. In this case, one end of the tension spring is fixed to the first end 188 of the bellows 186 and the other end of the tension spring is fixed to the second end 190 of the bellows 186 or to the sealing member 178. Thus, the tension spring tends to compress the bellows 186 and to pull the sealing member 178 towards the first end 188 of the bellows 186. The biasing force of the bellows biasing member is less than the biasing force of the biasing member 116. The biasing member 116 tends to move the immersion tube 110 so as to contact an inner surface of the bottom of the reagent vessel 106. For this reason, the immersion tube 110 may comprise one or more lateral openings at its leading end through which the reagent may be sucked or the leading end of the immersion tube 110 may comprise small spacers or filter members which avoids the openings to be blocked or obstructed by the bottom of the reagent vessel 106.

Figure 13:
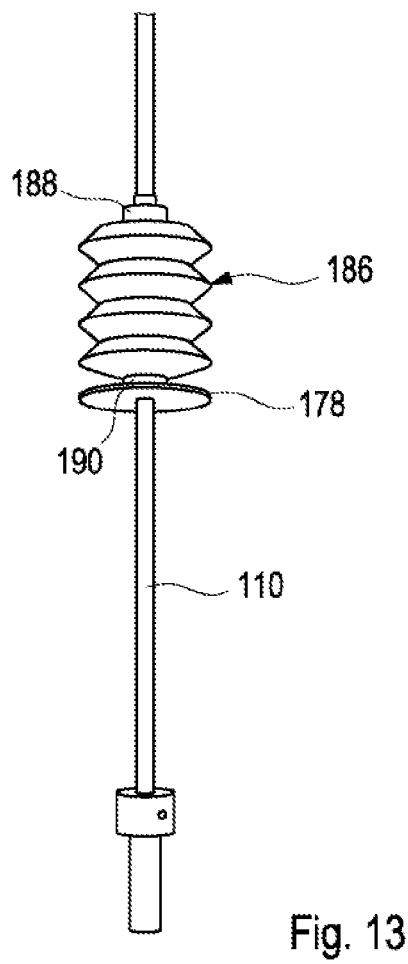
FIG. 13 shows a perspective view of the bellows and the immersion tube according to a first modification.

FIG. 13 shows a perspective view of the bellows 186 and the immersion tube 110 according to a first modification. Hereinafter, only the differences from the bellows of FIG. 12 will be described and like constructional members are indicated by like reference numerals. The bellows 186 is provided at a position which is outside of the reagent vessel 106 when the immersion tube 110 is at its lowered position, the bellows biasing member 191 is a compression spring or the like. In this case, one end of the compression spring is fixed to the first end 188 of the bellows 186 and the other end of the tension spring is fixed to the second end 190 of the bellows 186 or to the sealing member 178. Thus, the compression spring tends to extend the bellows 186 and to push the sealing member 178 away from the first end 188 of the bellows 186. In any case, the sealing member 178 is moveable relative to the immersion tube 110. The biasing force of the bellows biasing member 191 is less than the biasing force of the biasing member 116. The biasing member 116 tends to move the immersion tube 110 so as to contact an inner surface of the bottom of the reagent vessel 106. For this reason, the immersion tube 110 may comprise one or more lateral openings at its leading end through which the reagent may be sucked or the leading end of the immersion tube 110 may comprise small spacers or filter members which avoids the openings to be blocked or obstructed by the bottom of the reagent vessel 106.

Figure 14:
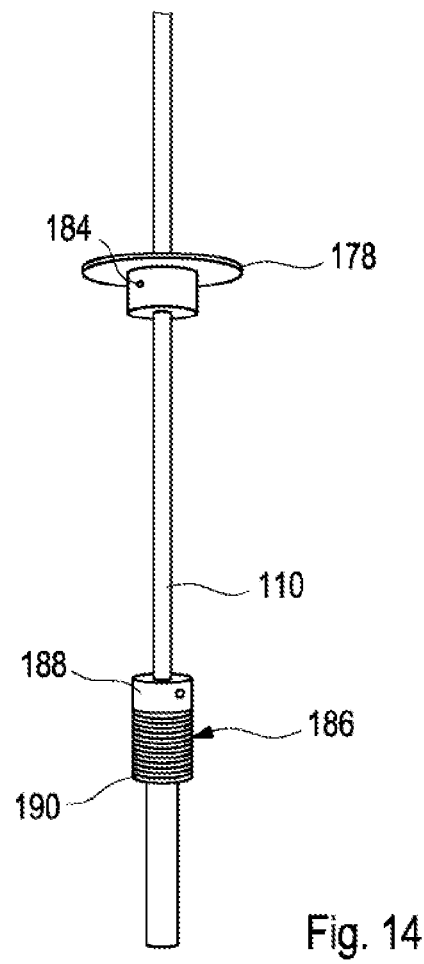
FIG. 14 shows a perspective view of the bellows and the immersion tube according to a second modification.

FIG. 14 shows a perspective view of the bellows 186 and the immersion tube 110 according to a second modification. Hereinafter, only the differences from the bellows of FIG. 12 will be described and like constructional members are indicated by like reference numerals. As shown in FIG. 14, the bellows 186 is provided at a position which is inside of the reagent vessel 106 when the immersion tube 110 is at its lowered position. Particularly, the bellows 186 is arranged adjacent the leading end of the immersion tube 110 and, therefore, is spaced apart from the sealing member 178. The bellows 186 is arranged such that the first end 188 facing the sealing member 178 is mounted stationary to the immersion tube 110 and the second end 190 facing away from the sealing member 178 is moveable relative to the immersion tube 110. The bellows biasing member 191 is a compression spring or the like. In this case, the end of the compression spring is fixed to the first end 188 of the bellows 186 and the other end of the tension spring is fixed to the second end 190 of the bellows 186. Thus, the compression spring tends to extend the bellows 186. The biasing force of the bellows biasing member 191 is less than the biasing force of the biasing member 116. The biasing member 116 tends to move the immersion tube 110 so as to contact an inner surface of the bottom of the reagent vessel 106. For this reason, the bellows 186 may protrude with its second end 190 from the leading end of the immersion tube 110 and be connected to or integrally formed with a filter member having openings arranged so as to avoid the openings to be blocked or obstructed by the bottom of the reagent vessel 106.

Figure 15:
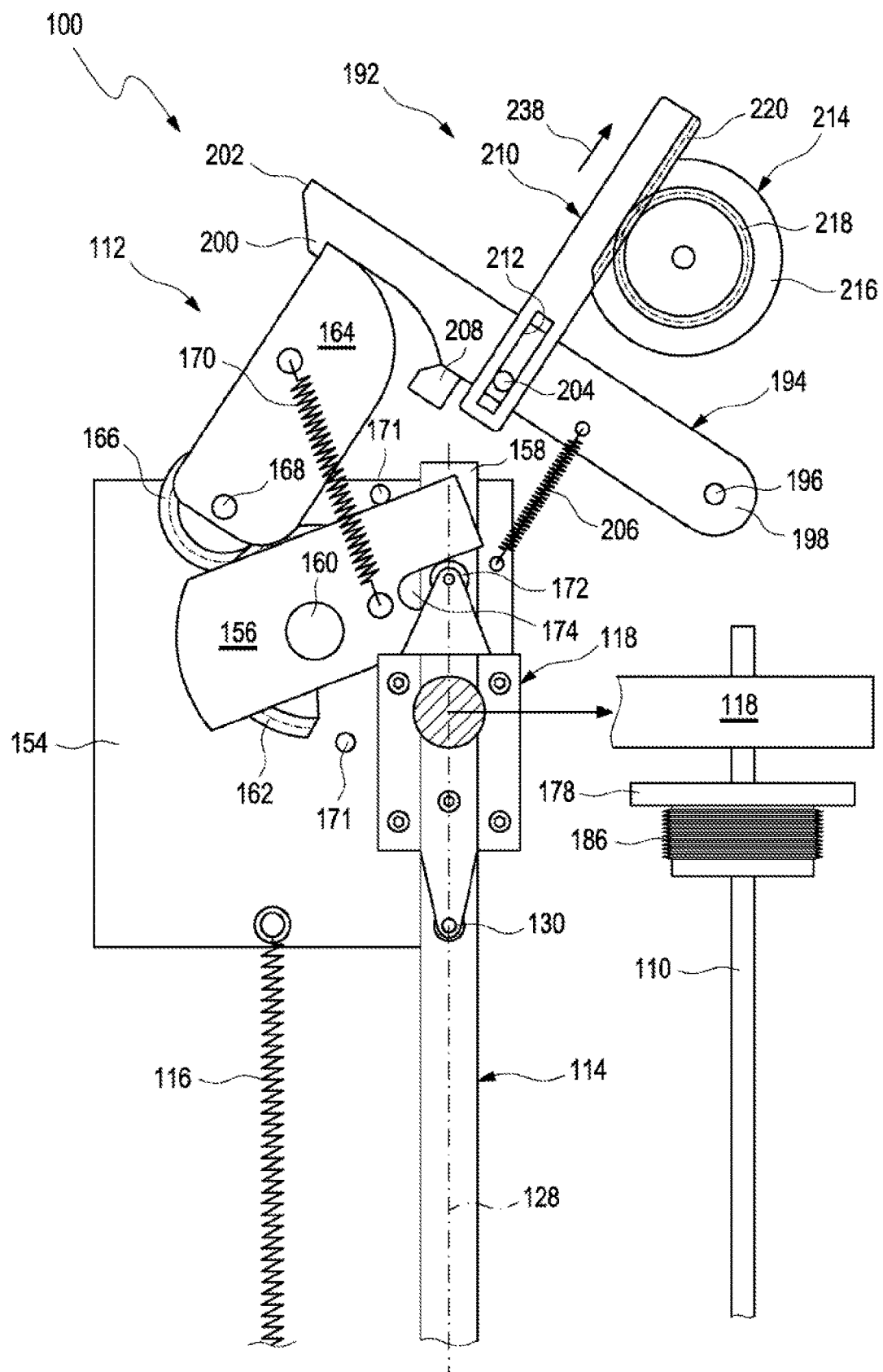
FIG. 15 shows a perspective view of the upper part of the lifting device in another operation state.

FIG. 15 shows a perspective view of the upper part of the lifting device 112 in another operation state. The long arrow in FIG. 15 is intended to indicate the position for the immersion tube holder 118 and the immersion tube 110 shown in the right portion of FIG. 15. The automatic analyzer 100 further comprises a locking device 192 configured to lock the immersion tube 110 in the lifted position and to allow the immersion tube 110 to be moved towards the lowered position only if the identity of the reagent detected by the detector 108 corresponds to a target identity of the reagent. With other words, the locking device 192 allows to move the immersion tube 110 to the lowered position only if there is a match between a target reagent and the actual reagent identified by the detector 108. It has to be noted that the locking device 192 is omitted in FIGS. 2, 7 to 11 and 15 for explanatory reasons only and is actually present. The locking device 192 is arranged adjacent the upper end 158 of the guide rail 114. The locking device 192 comprises a locking lever 194. The locking lever 194 is pivotable around a locking lever axis 196 located adjacent a rear end 198 of the locking lever 194. The locking lever 194 comprises a hook 200 located adjacent a front end 202 of the locking lever 194. The hook 200 is configured to engage the lever member 164. The locking lever 194 comprises a protrusion 204 such as a pin which may be located in the center of the locking lever 194. The locking device 192 further comprises a tension spring 206 which is connected to the locking lever 194 and the second support member 154. The tension spring 206 provides a biasing force to the locking lever 194 in a direction towards the second support member 154. The locking device 192 further comprises a stopper 208 configured to stop the lever member 164. The locking device 192 further comprises a drawing lever 210 having a hole 212 such as an elongated or slotted hole. The protrusion 204 of the locking lever 194 engages the hole 212. The locking device 192 further comprises a drive 214 configured to move the drawing lever 210 in a direction away from the locking lever 194. For example, the drive 214 comprises a motor 216 connected to a gear or pinion 218 which in turn engages a rack portion 220 of the drawing lever 210. Needless to say, any drive configured to move the locking lever 194 away from the lever member 164 may be applied. For example, an eccentric cam acting to a lower side of the locking lever and driven by a drive, a magnet such as an electric magnet drawing the locking lever 194 away from the lever member 164 or a rotating magnet may be applied. The locking device 192 may be modified in that the locking lever 194 does not comprise the protrusion 204 engaging the hole 212 of the drawing lever 210. Rather, the hole 212 is a through hole or slot and the locking lever extend through the hole 212.

Figure 16:
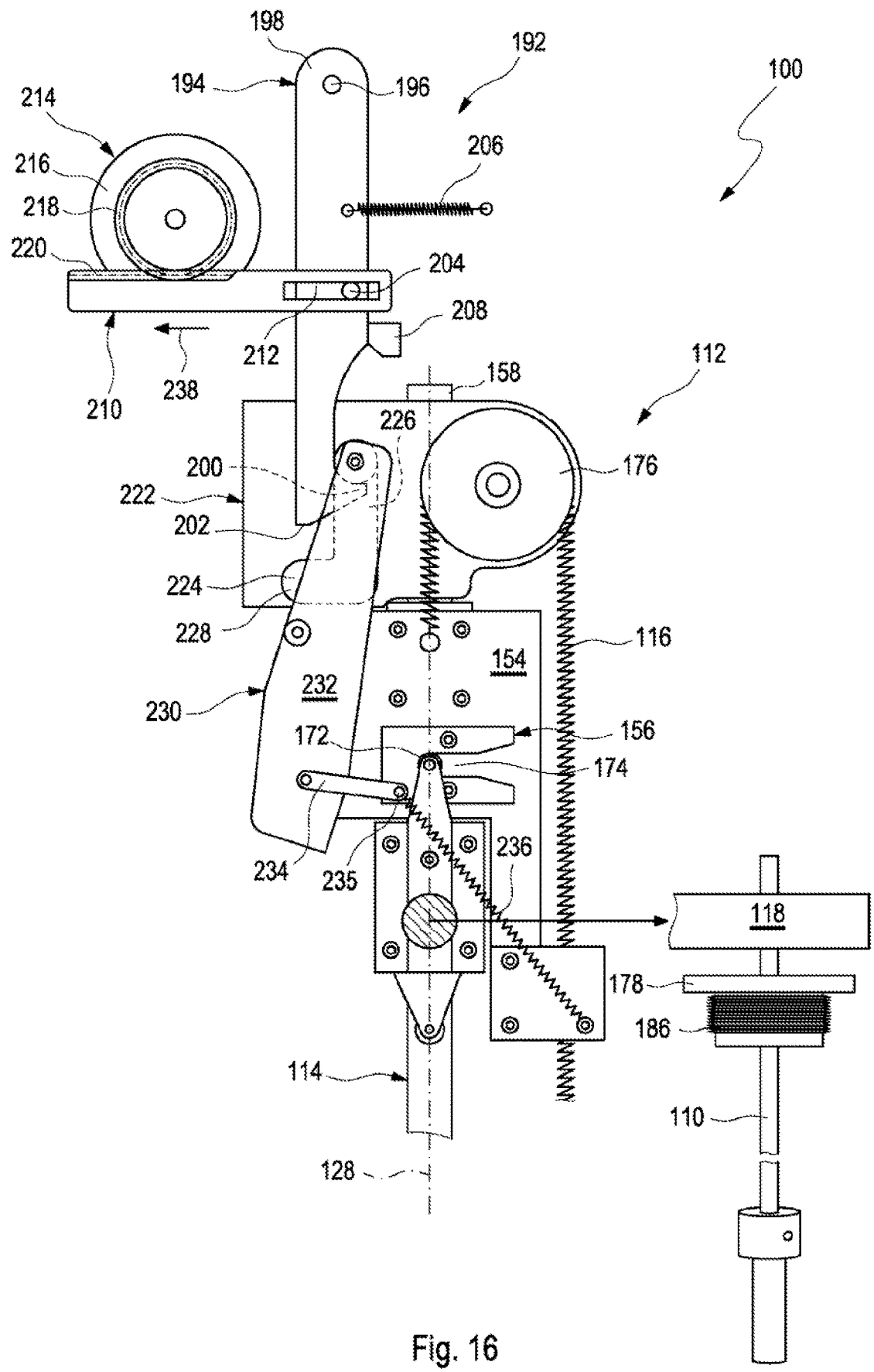
FIG. 16 shows a perspective view of the upper part of the lifting device according to a modification of the present disclosure.

FIG. 16 shows a perspective view of the upper part of the lifting device 112 according to a modification of the present disclosure. Hereinafter, only the differences from the embodiment shown in FIGS. 7 to 15 will be explained and like constructional members are identified by like reference numerals. Generally, with the modified embodiment shown in FIG. 16, the upper part of the lifting device 112 is similar to the lower part but inverted. In this respect, it has to be noted that the at least one biasing member 116 does not need to be the same as shown in FIGS. 7 to 15 but may be connected to another part than the first support member 120. For example, the may be two biasing members 116, wherein one biasing member 116 is connected to the first support member 120 as well as to an intermediate member not shown in detail located stationary between the upper and lower parts of the lifting device 112 and the other biasing member 116 is connected to the second support member 154 and to the intermediate member or any other stationary intermediate position. The long arrow in FIG. 16 is intended to indicate the position for the immersion tube holder 118 and the immersion tube 110 shown in the right portion of FIG. 16. Particularly, according to the modified embodiment shown in FIG. 16, the automatic analyzer 100 comprises a second slotted guide member 222 comprising a second guide slot 224 and being arranged adjacent to or at the upper end 158 of the guide rail 114. The second guide slot 224 comprises a third slot portion 226 being substantially parallel to the centerline 128 of the guide rail 114 and a fourth slot portion 228 being substantially perpendicular to the centerline 128 of the guide rail 114. The third slot portion 226 and the fourth slot portion 228 transition into one another. The automatic analyzer 100 comprises a second link assembly 230 engaging the second guide slot 224 and pivotally connected to the second engaging member 156. The second link assembly 230 comprises a third link 232 engaging the second guide slot 224 and a fourth link 234 pivotally connected to the second engaging member 156 at a second position 235 spaced apart from the second axis 160. The third link 232 and the fourth link 234 are pivotally connected to one another. The third link 232 is connected to a second link biasing member 236 configured to bias the third link 232 in a direction inclined with respect to the centerline 128 of the guide rail 114 and away from the fourth link 234. The locking device 192 is also present. The hook 200 of the locking lever 194 is configured to engage the third link 232. For example, the third link 232 comprises a depression or the like which is engageable by the hook 200. The third link 232 engages the second guide slot 224 by means of a roller or the like.

The automatic analyzer 100 may further be modified as will be explained in further detail below. The lifting device 112 may be operated by a robot or the like independent or separate from the automatic analyser 100 as it allows rather great tolerances with the operation and despite reliably allows to move into the end positions, i.e., the lowered position and the lifted position, due to the support by the biasing member 116. Further, the lifting device 112 only requires a linear movement upwards and downwards. The robot may also realize the replacement of a reagent vessel 106. The communication with the robot for lowering the immersion tube may be wireless such as by means of WLAN, Bluetooth, video or infrared signal after a positive check of the reagent vessel 106 from the detector 108 and its controller. Further, the automatic analyzer 100 may inform a user via a display or the like or the robot via a wireless communication such as by means of WLAN, Bluetooth, video or infrared signal to lift the immersion tube 110 and to take an empty reagent vessel 106. The biasing member 116 and/or the lever biasing member 170 may be a spiral spring.

Hereinafter, an operation of the automatic analyzer 100 will be described with reference to FIGS. 1 to 13. The explanation of the operation starts with reference to FIG. 1 showing the reagent vessel 106 loaded into the automatic analyzer 100. The immersion tube 110 is in the lowered position where it is inserted into the reagent vessel 106. Further explanations of the operation are given with the assumption that the detector 108 has identified a correct reagent of the reagent vessel 106. In order to move the immersion tube 110 into the lowered position, reference is made firstly with respect to the lower part of the lifting device 112 starting with an intermediate position between the lifted positon and the lowered position shown in FIG. 2.

As shown in FIG. 3, when the immersion tube 110 is in the intermediate position, the first support member 120 is spaced apart from the lower end 124 of the guide rail 114 at a distance of 20 to 40 mm such as 30 mm. The first engaging member 122 is oriented such that the first slot 132 extends parallel to the centerline 128 of the guide rail 114 with the opening of the first slot 132 facing the upper end 158 of the guide rail 114. The first link 146 of the first link assembly 140 is located in the second slot portion 144 of the first slotted guide member 136.

When the immersion tube 110 and the immersion tube holder 118 are further lowered as shown in FIG. 4, the first pin or roller 130 of the immersion tube holder 118 starts to enter the first slot 132 of the first engaging member 122.

Thereby, the first engaging member 122 is rotated or pivoted counter clockwise as shown in FIG. 5. The pivotal movement of the first engaging member 122 is substantially facilitated by the user's manual movement but additionally by the weight of the immersion tube holder 118 and the first axis 126 being spaced apart from the centerline 128 of the guide rail 114. At the same time, the first link 146 is pivoted relative to the second link 148 and moves from the second slot portion 144 into the first slot portion 142 of the first guide slot 138. Further, the first support member 120 is automatically moved downwards to the lower end 124 of the guide rail 114 by means of the biasing force of the biasing member 116. Thereby, the immersion tube 110 and the immersion tube holder 118 are moved into the lowered position as shown in FIG. 6. The biasing force provided by the biasing member 116 is adjusted such that the immersion tube holder 118 is moved without any excessive acceleration and that the sealing member 178 is pressed onto the rim 182 of the opening 180 of the reagent vessel 106 with sufficient force to prevent any leakage of evaporated reagent. Further, the bellows 186 allows to compensate any variation of the height of different reagent vessels 106. With other words, when the immersion tube holder 118 is lowered, it is automatically coupled to the first engaging member 122 at the first support member 120 as of a predetermined position close to the lowered position which is defined by the point of engagement of the first pin or roller 130 and the first slot 132.

When the immersion tube 110 or the immersion tube holder 118 is lifted as shown in FIG. 7, for example because a replacement of the reagent vessel 106 is intended, the user lifts the immersion tube holder 118. Thereby, the first support member 120 is moved upwards. Further, the first link 146 is pivoted relative to the second link 148 and moves from the first slot portion 142 into the second slot portion 144 of the first guide slot 138 which is facilitated by the first link biasing member 152. Thereby, the first engaging member 122 is rotated or pivoted clockwise and the first link assembly 140 is preloaded.

In order to move the immersion tube 110 into the lifted position, reference is made secondly with respect to the upper part of the lifting device 112 starting with the intermediate position between the lifted positon and the lowered position shown in FIG. 7.

When further lifting the immersion tube 110 and the immersion tuber holder 118, the immersion tube holder 118 advances the second engaging member 156 as shown in FIG. 8. As shown in FIG. 8, when the immersion tube holder 118 is in the intermediate position, the second slot 174 of the second engaging member 156 is oriented inclined with respect to the centerline 128 of the guide rail 114 and the opening of the second slot 174 faces downwards towards the lower end 124 of the guide rail 114. Further, the lever member 164 is in a position being rotated counter-clockwise.

When the immersion tube 110 and the immersion tube holder 118 is further lifted as shown in FIG. 9, the second pin or roller 172 of the immersion tube holder 118 is inserted into the second slot 174 and engages the upper wall thereof. Thereby, the second engaging member 156 is rotated or pivoted counter-clockwise. At the same time, the lever member 164 is rotated or pivoted clockwise due to the meshing of the first gear 162 and the second gear 166 which is facilitated by the biasing force of the lever biasing member 170. Thus, the immersion tube 110 and the immersion tube holder 118 are automatically moved into the lifted position as shown in FIG. 10. The biasing force of the lever biasing member 170 is adjusted such that the immersion tube 110 is moved into the lifted position without excessive acceleration so as to avoid a splattering of any reagent adhering to the immersion tube 110. With other words, when the immersion tube holder 118 is lifted, it is automatically coupled to the second engaging member 156 at the second support member 154 as of a predetermined position close to the lifted position which is defined by the point of engagement of the second pin or roller 172 and the second slot 174.

Further, as shown in FIGS. 10 and 15, the immersion tube 110 is locked in the lifted position by means of the locking device 192 as the hook 200 of the locking lever 194 engages the lever member 164. The stopper 208 for the locking lever 194 is provided in order to allow the drawing lever 210 to actuate the locking lever 194 when the immersion tube 110 is drawn into the lifted position.

In the lifted position, the immersion tube 110 is retracted from the reagent vessel 106 such that the reagent vessel may be replaced by a new or other reagent vessel 106. The detector 108 then identifies the reagent stored in the new reagent vessel 106 such as by reading the RFID tag or barcode located at the reagent vessel 106. If the identity of the reagent detected by the detector 108 corresponds to a target identity of the reagent, the detector 108 sends a signal to the locking device 192. The locking device 192 then operates the motor 216 so as to rotate the pinion 218 in a clockwise direction with respect to the illustration of FIG. 15. Thereby, the drawing lever 210 is moved away from the locking lever 194 as indicated by arrow 238. Thus, the hook 200 of the locking lever 194 is disengaged from the lever member 164. The immersion tube holder 118 may then be moved downwards out of the lifted position.

When the immersion tube holder 118 is moved downwards as shown in FIG. 10, the second engaging member 156 is rotated or pivoted clockwise. At the same time, the lever member 164 is rotated or pivoted counter-clockwise due to the meshing of the first gear 162 and the second gear 166. Further, the second pin or roller 172 is disengaged from the second slot 174 allowing to further move the immersion tuber 110 and the immersion tube holder 118 towards the lowered position.

If the modified embodiment shown in FIG. 16 is applied as upper part of the lifting device 112, the operation thereof is as follows. When the immersion tube 110 and the immersion tube holder 118 are moved from the lowered position towards the lifted position, the second pin or roller 172 is inserted into the second slot 174. Then, the second engaging member 156 is rotated or pivoted counter-clockwise. At the same time, the third link 232 engaging the second guide slot 224 is moved from the fourth slot portion 228 into the third slot portion 226. Further, the third link 232 and the fourth link 234 are pivoted relative to one another. Thereby, the second pin or roller 172 is locked and the immersion tube holder is automatically drawn into the lifted position by means of the biasing force of the biasing member 116.

In the lifted position, the immersion tube 110 is retracted from the reagent vessel 106 such that the reagent vessel may be replaced by a new or other reagent vessel 106. The detector 108 then identifies the reagent stored in the new reagent vessel 106 such as by reading the RFID tag or barcode located at the reagent vessel 106. If the identity of the reagent detected by the detector 108 corresponds to a target identity of the reagent, the detector 108 sends a signal to the locking device 192. The locking device 192 then operates the motor 216 so as to rotate the pinion 218 in a counter-clockwise direction with respect to the illustration of FIG. 16. Thereby, the drawing lever 210 is moved away from the locking lever 194 as indicated by arrow 238. Thus, the hook 200 of the locking lever 194 is disengaged from the third link 232. The immersion tube holder 118 may then be moved downwards out of the lifted position.

When the immersion tube holder 118 is moved downwards, the second engaging member 156 is rotated or pivoted clockwise. At the same time, the third link 232 and the fourth link 234 are rotated or pivoted relative to one another such that the third link 232 is moved from the from the third slot portion 226 into the fourth slot portion 228. Further, the second pin or roller 172 is disengaged from the second slot 174 allowing to further move the immersion tuber 110 and the immersion tube holder 118 towards the lowered position.

LIST OF REFERENCE NUMBERS

100 automatic analyser
102 housing
104 analyzing instrument
106 reagent vessel
108 detector
110 immersion tube
112 lifting device
114 guide rail
116 biasing member
118 immersion tube holder
120 first support member
122 first engaging member
124 lower end
126 first axis
128 centerline
130 first pin or roller
132 first slot
134 first tapered inlet portion
136 first slotted guide member
138 first guide slot
140 first link assembly
142 first slot portion
144 second slot portion
146 first link
148 second link
150 first position
152 first link biasing member
154 second support member
156 second engaging member
158 upper end
160 second axis
162 first gear
164 lever member
166 second gear
168 third axis
170 lever biasing member
171 stopper member
172 second pin or roller
174 second slot
176 guide pulley
178 sealing member
180 opening
182 rim
184 ventilation orifice
186 bellows
188 first end
190 second end
191 bellows biasing member
192 locking device
194 locking lever
196 locking lever axis
198 rear end
200 hook
202 front end
204 protrusion
206 tension spring
208 stopper
210 drawing lever
212 hole
214 drive
216 motor
218 pinion
220 rack portion
222 second slotted guide member
224 second guide slot
226 third slot portion
228 fourth slot portion
230 second link assembly
232 third link
234 fourth link
235 second position
236 second link biasing member
238 arrow

What is claimed is:

1. An automatic analyzer for analyzing samples, comprising:
an immersion tube configured to retrieve a reagent stored in a reagent vessel,
a lifting device configured to lift and to lower the immersion tube, wherein the lifting device comprises:
a guide rail on which the immersion tube is slidably moveable between a lowered position, in which the immersion tube is configured to be immersed into the reagent vessel, and a lifted position, in which the immersion tube is configured to be retracted from the reagent vessel, and
at least one biasing member configured to bias the immersion tube towards the lowered position with a predetermined biasing force,
a detector configured to detect an identity of the reagent,
a locking device configured to lock the immersion tube in the lifted position and to allow the immersion tube to be moved towards the lowered position only if the identity of the reagent detected by the detector corresponds to a target identity of the reagent;
wherein the lifting device further comprises an immersion tube holder holding the immersion tube and moveably mounted to the guide rail, a first support member connected to the at least one biasing member and moveably mounted to the guide rail, and a first engaging member configured to engage the immersion tube holder, wherein the first engaging member is arranged adjacent a lower end of the guide rail, wherein the first engaging member is configured to releasably lock the immersion tube holder and to integrally move the immersion tube into the lowered position when engaged therewith; and wherein the first engaging member is pivotable around a first axis being perpendicular with respect to a centerline of the guide rail.

2. The automatic analyzer according to claim 1, wherein the immersion tube holder comprises a first pin or roller, wherein the first engaging member comprises a first slot configured to engage the first pin or roller.

3. The automatic analyzer according to claim 2, wherein the first slot is formed at least partially inclined with respect to the centerline of the guide rail such that the first engaging member is configured to be rotated around the first axis when engaging the first pin or roller.

4. The automatic analyzer according to claim 1, further comprising a first slotted guide member comprising a first guide slot and being arranged adjacent to the lower end of the guide rail and a first link assembly engaging the first guide slot and pivotally connected to the first engaging member, wherein the first guide slot comprises a first slot portion being substantially parallel to the centerline of the guide rail and a second slot portion being substantially perpendicular to the centerline of the guide rail.

5. The automatic analyzer according to claim 1, wherein the lifting device further comprises a second support member connected to the at least one biasing member and mounted to the guide rail, and a second engaging member configured to engage the immersion tube holder, wherein the second engaging member is arranged adjacent an upper end of the guide rail, wherein the second engaging member is configured to releasably lock the immersion tube holder and to integrally move the immersion tube into the lifted position when engaged therewith.

6. The automatic analyzer according to claim 5, wherein the second engaging member is pivotable around a second axis being perpendicular with respect to a centerline of the guide rail.

7. The automatic analyzer according to claim 6, wherein the immersion tube holder comprises a second pin or roller, wherein the second engaging member comprises a second slot configured to engage the second pin or roller.

8. The automatic analyzer according to claim 7, wherein the second slot is formed at least partially inclined with respect to the centerline of the guide rail such that the second engaging member is configured to be rotated around the second axis when engaging the second pin or roller.

9. The automatic analyzer according to claim 5, further comprising a second slotted guide member comprising a second guide slot and being arranged adjacent to the upper end of the guide rail and a second link assembly engaging the second guide slot and pivotally connected to the second engaging member, wherein the second guide slot comprises a third slot portion being substantially parallel to the centerline of the guide rail and a fourth slot portion being substantially perpendicular to the centerline of the guide rail.

10. The automatic analyzer according to claim 5, wherein the second support member is moveably mounted to the guide rail, wherein the at least one biasing member is configured to bias the immersion tube towards the lifted position with a predetermined biasing force.

11. The automatic analyzer according to claim 6, further comprising a lever member mounted to the second support member and rotatable around a third axis parallel to the second axis, wherein the second engaging member and the lever member are rotatable in opposite directions.

12. The automatic analyzer according to claim 11, further comprising a lever biasing member connected to the lever member and to the second engaging member, wherein the lever biasing member is configured to bias the immersion tube towards the lifted position with a predetermined biasing force.

13. The automatic analyzer according to claim 1, further comprising a sealing member arranged at the immersion tube and configured to seal an opening of the reagent vessel by engaging a rim of the opening and/or further comprising a bellows connected to the immersion tube with a first end of the bellows being fixed to the immersion tube and a second end of the bellows being moveable with respect to the immersion tube, wherein the bellows is arranged at the immersion tube at a position which is outside of the reagent vessel when the immersion tube is at its lowered position or wherein the bellows is arranged at the immersion tube at a position which is inside of the reagent vessel when the immersion tube is at its lowered position.

* * * * *